(12) United States Patent
Hattori

(10) Patent No.: US 7,385,492 B2
(45) Date of Patent: Jun. 10, 2008

(54) TIRE DISTORTION DETECTING METHOD, DISTORTION DETECTOR, SENSOR UNIT THEREOF, AND TIRE HAVING THE SAME

(75) Inventor: Yutaka Hattori, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 840 days.

(21) Appl. No.: 10/505,009

(22) PCT Filed: Jul. 18, 2003

(86) PCT No.: PCT/JP03/09168

§ 371 (c)(1), (2), (4) Date: Aug. 19, 2004

(87) PCT Pub. No.: WO2004/013595

PCT Pub. Date: Feb. 12, 2004

(65) Prior Publication Data

US 2005/0146423 A1 Jul. 7, 2005

(30) Foreign Application Priority Data

Aug. 2, 2002 (JP) .............................. 2002-226041

(51) Int. Cl.
- *B60C 23/00* (2006.01)
- *B60R 25/10* (2006.01)
- *G08B 13/14* (2006.01)

(52) U.S. Cl. .................. 340/442; 340/445; 340/447; 340/426.33; 340/572.1; 340/572.7; 340/572.8; 73/146.5

(58) Field of Classification Search .................. 340/442
See application file for complete search history.

(56) References Cited

U.S. PATENT DOCUMENTS

| | | | |
|---|---|---|---|
| 4,953,393 A | 9/1990 | Galasko et al. | |
| 6,181,287 B1* | 1/2001 | Beigel | 343/741 |
| 6,285,342 B1* | 9/2001 | Brady et al. | 343/895 |
| 6,791,457 B2* | 9/2004 | Shimura | 340/448 |

FOREIGN PATENT DOCUMENTS

| | | |
|---|---|---|
| EP | 0 832 765 A2 | 4/1998 |
| JP | 10-019710 A1 | 1/1998 |
| JP | 10-302187 A1 | 11/1998 |

OTHER PUBLICATIONS

International Search Report for PCT/JP03/09168 mailed on Nov. 4, 2003.

* cited by examiner

*Primary Examiner*—Donnie L. Crosland
(74) *Attorney, Agent, or Firm*—Knobbe Martens Olson & Bear LLP

(57) ABSTRACT

A tire distortion detecting method for detecting a detection of the tire during the running of a vehicle, a distortion detector, a sensor unit thereof, and a tire having the same whereby the occurrence of a deterioration can be reduced and applicability is widened to a control system such as a stability control system. Sensor units 100 are embedded at some intervals in the circumferential direction of the tire. In the sensor unit 100, a conductor pattern is changed in shape according to a distortion of a tire 300 so as to change the resonance frequency of a radiated electromagnetic wave. An electromagnetic wave is radiated from a monitoring device 200. An electromagnetic wave radiated from the sensor unit 100 is compared with a detection result stored when no distortion occurs on the tire 300, so that a distortion of the tire 300 is detected.

22 Claims, 19 Drawing Sheets

TIRE DISTORTION DETECTING METHOD, DISTORTION DETECTOR, SENSOR UNIT THEREOF, AND TIRE HAVING THE SAME

TECHNICAL FIELD

The present invention relates to a tire distortion detecting method for detecting a distortion of a tire during the running of a vehicle, a distortion detector, a sensor unit thereof, and a tire having the same.

BACKGROUND ART

Conventionally cautions for the safe driving of a vehicle include a proper setting of an air pressure in a tire of the vehicle and attention to the wear of the tire. For example, a reduced air pressure in a tire increases the occurrence of flat tires and causes a burst at high speed, resulting in a serious accident. Therefore, drivers have to check tires on a daily basis.

However, even if tires are checked and preferred conditions are maintained for the tires, when a friction between a road surface and the tires decreases, for example, when a road surface is wet on a rainy day, skids occur under braking and move a vehicle in an unexpected direction, resulting in an accident.

In order to prevent accidents caused by skids and a fast start, Anti-Lock Brake System (hereinafter referred to as ABS) and a traction control system are developed, and a stability control system having a YAW sensor is also developed in addition to these systems.

For example, ABS is a system of detecting a rotating state of each tire and controlling a braking force based on detection results so as to prevent the tires from locking.

The number of revolutions, an air pressure, a distortion, and so forth of each tire are detected as a rotating state of the tire and detection results can be used for control.

For example, a detector for automatically detecting an air pressure of a tire is known. Such a detector uses a so-called "indirect" method of detecting an air pressure of a tire. In this method, data is inputted from an ABS speed sensor to estimate an air pressure of a tire.

As a method of detecting an air pressure of a tire that is used for the detector, the following methods are known: (a) a method of calculating a change (distortion) in the rolling radius of a tire from an angular speed of rotation of a wheel, the change being caused by a reduced air pressure, and (b) a method of performing FFT (Fast Fourier Transform) on an input signal and performing calculations using a change in the natural frequency of a tire.

On the other hand, as examples of a sensor and a tire that are used for the ABS, the traction control system, and the stability control system, U.S. Pat. No. 5,895,854 (hereinafter referred to as conventional example 1) and U.S. Pat. No. 6,308,758 (hereinafter referred to as conventional example 2) are known.

In conventional example 1, magnetic bar codes are provided which are arranged in lines in the circumferential direction of the side wall of a tire with adjacent parts alternately changed in polarity, and the bar codes are read by a sensor fixed on a chassis and a wheel shaft. Thus, the rotating speed of the tire can be detected. Further, the magnetic bar codes are provided in two or more lines in the radius direction of the tire, thereby calculating a force and a deformation in the radius direction of the tire based on a phase difference between the detection results of the inner and outer magnetic bar codes.

In contrast to conventional example 1 having difficulty in forming magnetic bands at small intervals, conventional example 2 reduces the difficulty and discloses a tire improved in the resolution of magnetic bar codes arranged in lines in the circumferential direction of the side wall of the tire with adjacent parts alternately changed in polarity.

However, in conventional examples 1 and 2, since the magnetic bands are formed on the side wall when the tire is manufactured, it is quite troublesome to set the magnetic force of the magnetic band at the optimum value. That is, when the magnetic force of the magnetic band is much higher than the optimum value, a magnetic substance such as iron sand and an iron piece on a road surface may be adsorbed. Further, when the magnetic force of the magnetic band is lower than the optimum value, the detection of the sensor becomes difficult.

Moreover, the magnetic bands may gradually decrease in magnetization due to heat generated on the tire during the running of a vehicle and the detection of the sensor may become more difficult as running time increases.

In view of the above problems, an object of the present invention is to provide a tire distortion detecting method for detecting a distortion of the tire during the running of a vehicle, a distortion detector, a sensor unit thereof, and a tire having the same that can reduce the occurrence of a deterioration and can be used for a control system such as a stability control system.

DISCLOSURE OF THE INVENTION

In a tire distortion detecting method of the present invention, when a distortion of a tire is detected by using a plurality of sensor units which are embedded in the tire at predetermined intervals in the circumferential direction of the tire and each have a conductor pattern changed in shape according to a distortion of the tire, and a monitoring device having a radiation unit provided in a tire house of a vehicle, an electromagnetic wave of a first frequency is radiated from the radiation unit to the sensor unit.

The sensor unit having received the electromagnetic wave of the first frequency converts the energy of the electromagnetic wave of the first frequency into electric energy and uses the electric energy to drive electromagnetic wave radiating means. According to a distortion of the conductor pattern, the electromagnetic wave radiating means changes a resonance frequency in a frequency band having a predetermined width including a second frequency, which serves as a fundamental frequency, and the electromagnetic wave radiating means radiates an electromagnetic wave.

The monitoring device receives the electromagnetic wave having been radiated from the electromagnetic wave radiating means of the sensor unit, detects at least one of the intensity, phase, and frequency of the received electromagnetic wave, and detects a distortion of the tire by comparing the detection result and a detection result stored when no distortion occurs on the tire.

According to the tire distortion detecting method, the sensor unit having received the electromagnetic wave of the first frequency converts the energy of the electromagnetic wave of the first frequency into electric energy, the electromagnetic wave being radiated from the radiation unit provided in the tire house to the sensor unit embedded in the tire, and the sensor unit drives the electromagnetic wave radiating means by using the electric energy to radiate an electromagnetic wave.

At this point, according to a distortion of the conductor pattern, the electromagnetic wave radiating means of the sensor unit changes a resonance frequency in a frequency band having the predetermined width including the second frequency, which serves as the fundamental frequency, and the electromagnetic wave radiating means radiates the electromagnetic wave. Since the conductor pattern is embedded in the tire, the conductor pattern is deformed according to a distortion of the tire. As a result, changes are made on an electrical resonance frequency of the conductor pattern, a phase of an electromagnetic wave when the conductor pattern is used as an antenna, and so on.

The monitoring device receives an electromagnetic wave having been radiated from the sensor unit. At this point, the received electromagnetic wave is changed in phase, field intensity, frequency, and so on according to a deformation of the conductor pattern.

Further, the monitoring device detects at least one of the phase, field intensity, and frequency of the electromagnetic wave having been received from the sensor unit when no distortion occurs on the tire, e.g., at the start of the vehicle, and the monitoring device stores the detection result.

Moreover, the monitoring device detects at least one of the phase, field intensity, and frequency of the electromagnetic wave having been received from the sensor unit, e.g., during the running of the vehicle, and the monitoring device detects a distortion of the tire by comparing the detection result and a stored value of the detection result obtained when no distortion occurs on the tire.

Besides, according to the tire distortion detecting method of the present invention, the radiation unit radiates an electromagnetic wave to the one or more sensor units of the tire within a predetermined distance from a position where the radiation unit is attached.

According to the tire distortion detecting method of the present invention, a distortion of the tire can be detected within the predetermined distance by receiving an electromagnetic wave radiated from the one or more sensor units within the predetermined distance from the position where the radiation unit is attached.

Further, according to the tire distortion detecting method of the present invention, an electromagnetic wave is radiated in a time sharing manner from the radiation units disposed on two or more different positions of the tire house, so that a distortion in a different part of one tire can be detected for each of the radiation units.

Moreover, according to the tire distortion detecting method of the present invention, by setting the first frequency and the second frequency at a frequency of 1 GHz or higher, the influence of a reinforcing metal provided in the tire is reduced and large changes are obtained in the phase, field intensity, frequency, and so on of the electromagnetic wave. Such changes are resulted from a deformation of the conductor pattern.

Further, according to the tire distortion detecting method of the present invention, the sensor unit transmits identification information specific to the sensor unit by using the electromagnetic wave, and the monitoring device identifies the sensor unit based on the identification information received from the sensor unit. According to the tire distortion detecting method of the present invention, each of the sensor units can be identified by the identification information. Thus, even when the sensor units are provided in two or more tires attached to the vehicle, a distortion can be detected for each of the tires.

Moreover, a tire distortion detector for detecting a distortion of a tire during the running of a vehicle according to the present invention is constituted of a plurality of sensor units embedded in the tire at predetermined intervals in the circumferential direction of the tire, and a monitoring device including a radiation unit provided in a tire house of the vehicle.

The sensor unit comprises a conductor pattern of a predetermined shape on a surface of a sheet which is flexible and electrically insulative with a predetermined area, means for receiving an electromagnetic wave of a first frequency from the radiation unit and converting the high frequency energy of the electromagnetic wave into electric energy, and means which is operated by the electric energy, is connected to the conductor pattern, changes a resonance frequency, according to a distortion of the conductor pattern, in a frequency band having a predetermined width including a second frequency serving as a fundamental frequency, and radiates an electromagnetic wave.

Further, the monitoring device comprises means for radiating the electromagnetic wave of the first frequency from the radiation unit to the sensor unit, means for receiving an electromagnetic wave radiated from the sensor unit, means for detecting at least one of the intensity, phase, and frequency of the received electromagnetic wave, means for storing a detection result obtained when no distortion occurs on the tire, and means for detecting a distortion of the tire by comparing the detection result and the detection result obtained when no distortion occurs on the tire.

According to the tire distortion detector of the present invention, when the electromagnetic wave of the first frequency is radiated from the radiation unit provided in the tire house to the sensor unit embedded in the tire, the energy of the electromagnetic wave of the first frequency is converted into electric energy in the sensor unit having received the electromagnetic wave of the first frequency and an electromagnetic wave of the second frequency is radiated from the sensor unit by the electric energy.

At this point, according to a distortion of the conductor pattern that occurs according to a distortion of the tire, the electromagnetic wave radiated from the sensor unit is changed in resonance frequency in the frequency band having the predetermined width including the second frequency, which serves as the fundamental frequency. Since the conductor pattern is embedded in the tire, the conductor pattern is deformed according to a distortion of the tire. As a result, according to a distortion of the tire, changes are made on an electrical resonance frequency of the conductor pattern, a phase of an electromagnetic wave when the conductor pattern is used as an antenna.

The electromagnetic wave radiated from the sensor unit is received by the monitoring device and an electromagnetic wave received by an external device is changed in phase, field intensity, frequency and so on according to a deformation of the conductor pattern.

The monitoring device detects at least one of the phase, field intensity, and frequency of the received electromagnetic wave, compares the detection result and a stored value of a detection result obtained when no distortion occurs on the tire, and detects a distortion of the tire based on the comparison result.

Moreover, according to the tire distortion detector of the present invention, at least a part of the conductor pattern is shaped like a rectangular wave and thus the positional relationship of the adjacent parts in the conductor pattern is readily changed according to a distortion of the tire. Thus, an electrical characteristic such as a resonance frequency of the conductor pattern is readily changed according to a distortion of the tire. Therefore, it is possible to obtain large changes in the phase, field intensity, frequency and so on of an electromagnetic wave radiated from the sensor unit, according to a distortion of the tire.

Further, according to the tire distortion detector of the present invention, by setting the first frequency and the second frequency at a frequency of 1 GHz or higher, the influence of a reinforcing metal provided in the tire is reduced and large changes are obtained in the phase, field intensity, frequency, and so on of the electromagnetic wave. Such changes are resulted from a deformation of the conductor pattern.

Besides, according to the tire distortion detector of the present invention, the first frequency and the second frequency are set at the same frequency and the monitoring device comprises means for alternately repeats the radiation of an electromagnetic wave of the first frequency and the reception of an electromagnetic wave radiated from the sensor unit. Thus, an antenna for radiating an electromagnetic wave and an antenna for receiving an electromagnetic wave can be shared in the monitoring device or the sensor unit. Additionally, a distortion can be readily recognized for each of the plurality of tires attached to the vehicle.

Further, according to the tire distortion detector of the present invention, the monitoring device comprises a plurality of radiation units provided on two or more different position of the tire house and means for radiating an electromagnetic wave in a time sharing manner from each of the radiation units. Moreover, each of the radiation units radiates an electromagnetic wave to the one or more sensor units of the tire within a predetermined distance from a position where the scanner unit is attached. According to the tire distortion detector of the present invention, a distortion in a different part of one tire can be detected for each of the radiation units.

Additionally, according to the tire distortion detector of the present invention, the sensor unit has means for switching the use of the conductor pattern serving as an antenna between the reception of an electromagnetic wave of the first frequency and the radiation of an electromagnetic wave of the second frequency. According to the tire distortion detector of the present invention, the conductor pattern can be used as an antenna for receiving an electromagnetic wave of the first frequency or radiating an electromagnetic wave of the second frequency, thereby reducing the shape of the sensor unit.

Further, according to the tire distortion detector of the present invention, the sensor unit comprises means for storing identification information specific to the sensor unit and means for transmitting the stored identification information by using an electromagnetic wave. Moreover, the monitoring device comprises means for receiving the identification information transmitted from the sensor unit and means for identifying the sensor unit based on the received identification information.

According to the tire distortion detector of the present invention, each of the sensor units can be identified by the identification information. Thus, even when the sensor units are provided in two or more tires attached to the vehicle, a distortion can be detected for each of the tires.

The sensor units of the present invention in the tire distortion detector are embedded in the tire at predetermined intervals in the circumferential direction of the tire. Further, the sensor unit of the present invention comprises a conductor pattern of a predetermined shape on a surface of a sheet which is flexible and electrically insulative with a predetermined area, means for receiving an electromagnetic wave of a first frequency from the radiation unit and converting the high frequency energy of the electromagnetic wave into electric energy, and means which is operated by the electric energy, is connected to the conductor pattern, changes a resonance frequency, according to a distortion of the conductor pattern, in a frequency band having a predetermined width including a second frequency serving as a fundamental frequency, and radiates an electromagnetic wave.

According to the sensor unit of the present invention, when the electromagnetic wave of the first frequency is radiated from the radiation unit to the sensor unit, the energy of the electromagnetic wave of the first frequency is converted into electric energy in the sensor unit having received the electromagnetic wave of the first frequency and an electromagnetic wave of the second frequency is radiated from the sensor unit by the electric energy.

At this point, according to a distortion of the conductor pattern that occurs according to a distortion of the tire, the electromagnetic wave radiated from the sensor unit is changed in resonance frequency in the frequency band having the predetermined width including the second frequency, which serves as the fundamental frequency. Since the conductor pattern is embedded in the tire, the conductor pattern is deformed according to a distortion of the tire. As a result, according to a distortion of the tire, changes are made on an electrical resonance frequency of the conductor pattern and a phase or frequency of an electromagnetic wave radiated when the conductor pattern is used as an antenna.

The electromagnetic wave radiated from the sensor unit is received by the monitoring device and an electromagnetic wave received by an external device is changed in phase, field intensity, frequency and so on according to a deformation of the conductor pattern.

The monitoring device detects at least one of the phase, field intensity, and frequency of the received electromagnetic wave and detects a distortion of the tire by comparing the detection result and a stored value of a detection result obtained when no distortion occurs on the tire.

Further, according to the sensor unit of the present invention, at least a part of the conductor pattern is shaped like a rectangular wave and thus the positional relationship of the adjacent parts in the conductor pattern is readily changed according to a distortion of the tire. Thus, an electrical characteristic of the conductor pattern is readily changed according to a distortion of the tire. Therefore, it is possible to obtain large changes in the phase, field intensity, frequency and so on of an electromagnetic wave radiated from the sensor unit, according to a distortion of the tire.

Moreover, according to the sensor unit of the present invention, the first frequency and the second frequency are set at a frequency of 1 GHz or higher. Hence, the influence of a reinforcing metal provided in the tire is reduced and large changes are obtained in the phase, field intensity, frequency, and so on of the electromagnetic wave. Such changes are resulted from a deformation of the conductor pattern.

Further, the sensor unit of the present invention has means for switching the use of the conductor pattern serving as an antenna between the reception of an electromagnetic wave of the first frequency and the radiation of an electromagnetic wave of the second frequency. Therefore, according to the sensor unit of the present invention, the conductor pattern is used as an antenna both for radiating an electromagnetic wave and receiving an electromagnetic wave, thereby miniaturizing the sensor unit.

Moreover, the sensor unit of the present invention comprises means for storing identification information specific to the sensor unit and means for transmitting the stored identification information by using the electromagnetic wave. According to the sensor unit of the present invention, each of the sensor units can be identified by the identification information. Thus, even when the sensor units are provided in two or more tires attached to the vehicle, a distortion can be detected for each of the tires.

According to the tire of the present invention, the plurality of sensor units are embedded in the tire at predetermined intervals in the circumferential direction of the tire. According to the tire of the present invention, the energy of the electromagnetic wave of the first frequency is converted into electric energy in the sensor unit having received the electromagnetic wave of the first frequency and an electromagnetic wave of the second frequency is radiated from the sensor unit by the electric energy.

At this point, according to a distortion of the conductor pattern that occurs according to a distortion of the tire, the electromagnetic wave radiated from the sensor unit is changed in resonance frequency in the frequency band having the predetermined width including the second frequency, which serves as the fundamental frequency. Since the conductor pattern is embedded in the tire, the conductor pattern is deformed according to a distortion of the tire. As a result, according to a distortion of the tire, changes are made on an electrical resonance frequency of the conductor pattern and a phase of an electromagnetic wave radiated when the conductor pattern is used as an antenna.

The electromagnetic wave radiated from the sensor unit is received by the monitoring device and an electromagnetic wave received by an external device is changed in phase, field intensity, frequency and so on according to a deformation of the conductor pattern.

Therefore, the monitoring device detects at least one of the phase, field intensity, and frequency of the received electromagnetic wave and detects a distortion of the tire by comparing the detection result and a stored value of a detection result obtained when no distortion occurs on the tire.

Further, according to the tire of the present invention, at least a part of the conductor pattern is shaped like a rectangular wave and thus the positional relationship of the adjacent parts in the conductor pattern is readily changed according to a distortion of the tire. Thus, an electrical characteristic of the conductor pattern is readily changed according to a distortion of the tire. Therefore, it is possible to obtain large changes in the phase, field intensity, frequency and so on of an electromagnetic wave radiated from the sensor unit, according to a distortion of the tire.

Moreover, according to the tire of the present invention, the first frequency and the first frequency are set at a frequency of 1 GHz or higher. Hence, the influence of a reinforcing metal provided in the tire is reduced and large changes are obtained in the phase, field intensity, frequency, and so on of the electromagnetic wave. Such changes are resulted from a deformation of the conductor pattern.

Further, according to the tire of the present invention, the plurality of sensor units are disposed in the same layer of the tire. Thus, it is possible to simplify the step of manufacturing the tire and readily set the positional relationship of the sensor units.

Moreover, according to the tire of the present invention, at least the four or more sensor units are embedded at regular intervals. Hence, it is possible to detect a distortion substantially around the perimeter of the tire. Further, when at least four sensor units are provided at regular intervals, a distortion occurring on a part between the adjacent sensor units propagates through the constituent elements of the tire to the sensor unit, thereby detecting a distortion substantially around the perimeter of the tire.

BEST MODES FOR CARRYING OUT THE INVENTION

The following will describe an embodiment of the present invention in accordance with the accompanying drawings.

Figure 1:
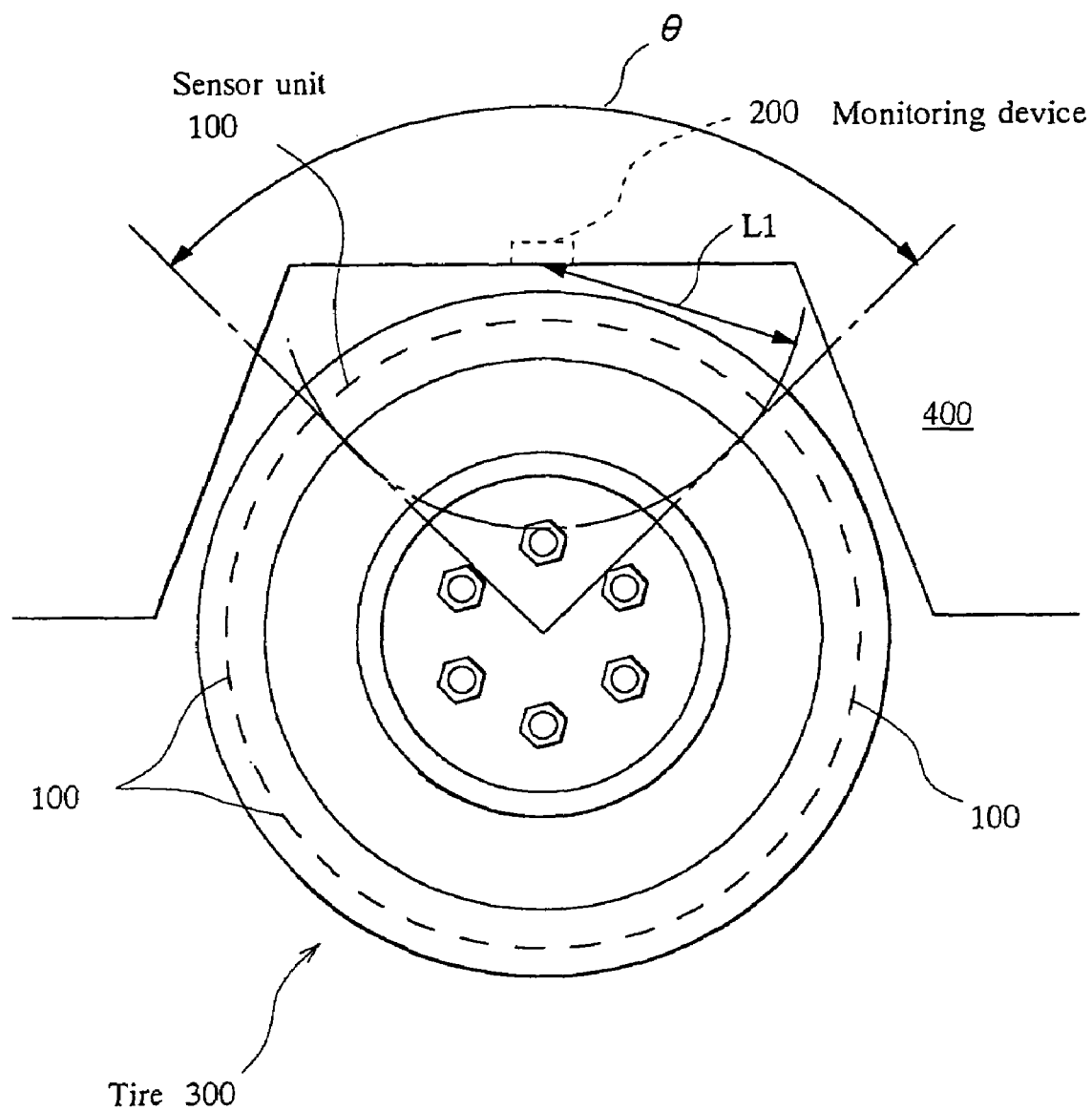
FIG. 1 is a schematic diagram showing a state of mounting a tire distortion detector into a vehicle according to Embodiment 1 of the present invention.
Figure 2:
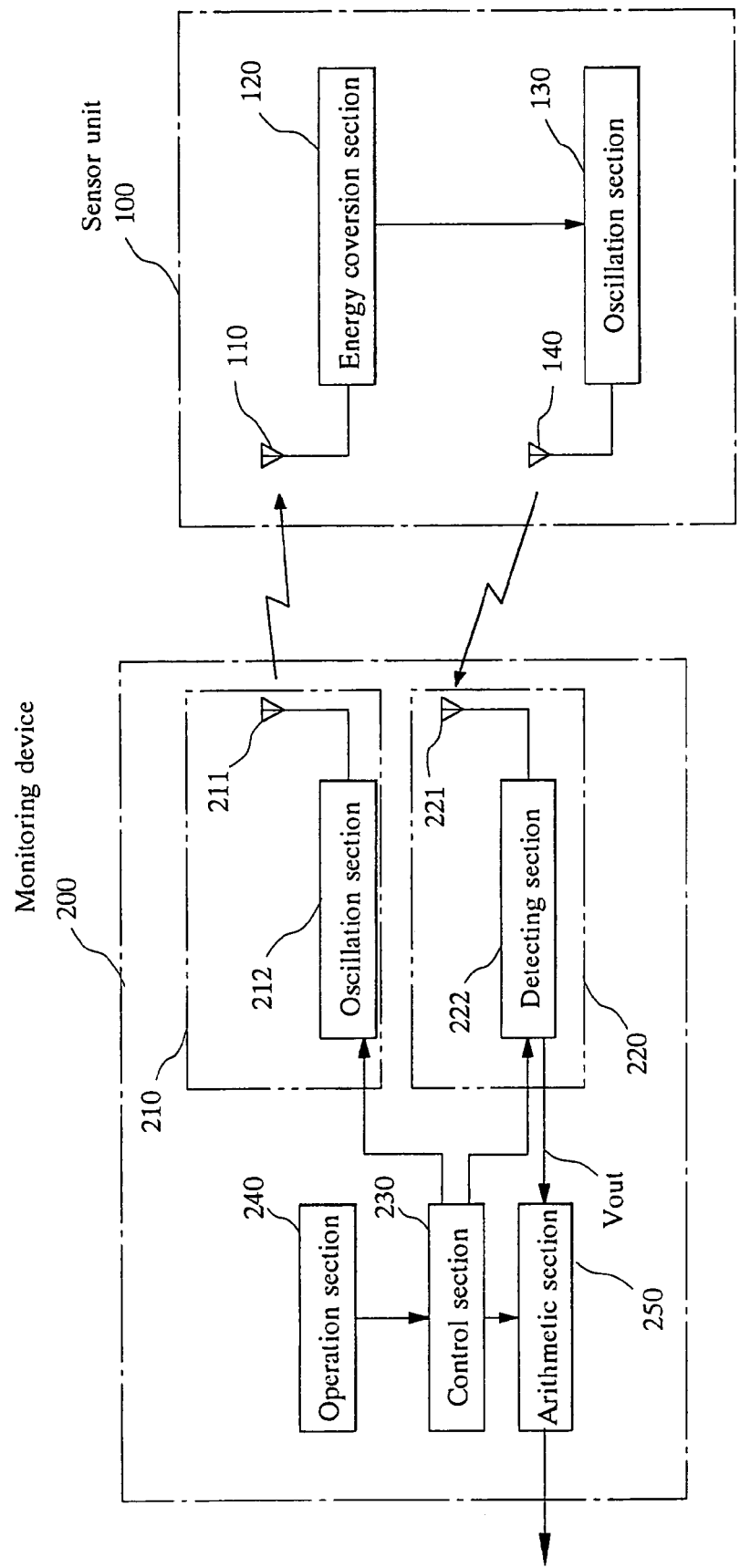
FIG. 2 is a schematic structural diagram showing an electric circuit of the tire distortion detector according to Embodiment 1 of the present invention.

FIG. 1 is a schematic view showing a state of mounting a tire distortion detector in a vehicle according to Embodiment 1 of the present invention. FIG. 2 is a schematic structural diagram showing an electric circuit of the tire distortion detector according to Embodiment 1. In FIGS. 1 and 2, reference numeral 100 denotes a plurality of sensor units embedded in a tire 300. Reference numeral 200 denotes a monitoring device which is disposed in a tire house 400 so as to correspond with the top of the tire 300. The tire distortion detector of the present embodiment is constituted of the plurality of sensor units 100 and the monitoring device 200.

The sensor unit 100 is constituted of an antenna 110 for receiving an electromagnetic wave having a predetermined frequency (first frequency) of 2.45 GHz band, an energy conversion section 120 for converting the energy of a received electromagnetic wave into electric energy, an oscillation section 130 operated by electric energy supplied from the energy conversion section 120, and an antenna 140 which is connected to the oscillation section 130 and radiates an electromagnetic wave having a predetermined frequency (second frequency) of 2.45 GHz band. In the present embodiment, the first frequency and the second frequency are both set at 2.45 GHz.

Figure 3:
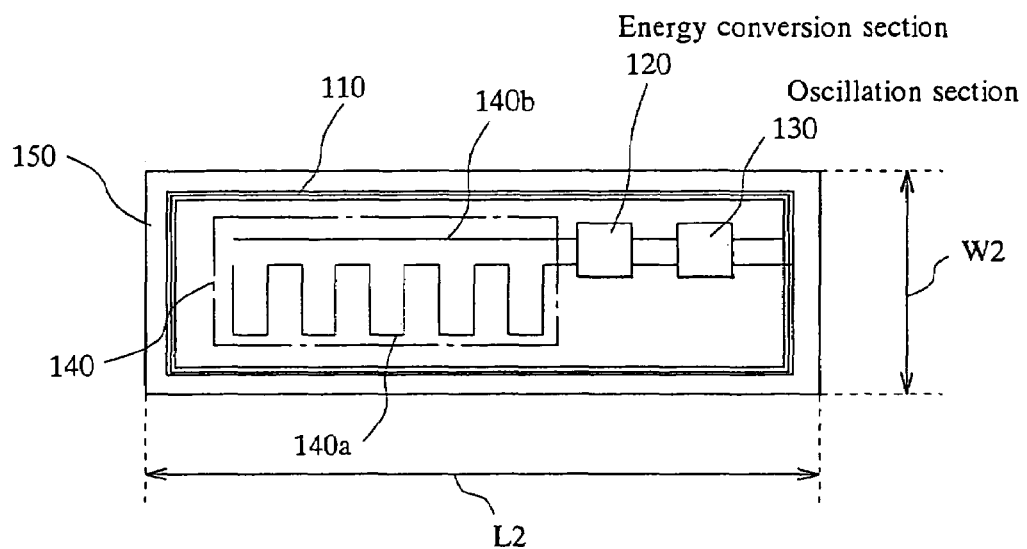
FIG. 3 is a plan view showing a sensor unit according to Embodiment 1 of the present invention.

As shown in FIG. 3, the sensor unit 100 is configured so that an IC chip constituting the energy conversion section 120, an IC chip constituting the oscillation section 130, the antenna 110 shaped like a loop, and the antenna 140 are sandwiched between two films 150. The antenna 140 is composed of a conductor pattern 140a shaped like a rectangular wave and a conductor pattern 140b shaped like a straight line.

The film 150 is composed of, for example, a polyimide film which is electrically insulative with a width (W2) of 5 mm and a length (L2) of 20 mm. Further, the antennas 110 and 140 are formed on the lower film by printing. The loop antenna 110 is disposed on the periphery of the film 150. Moreover, the conductor pattern 140a shaped like a rectangular wave and the conductor pattern 140b shaped like a straight line are disposed in such a manner as to stretch along the length (L2) of the film 150. The film 150 is flexible enough to be bent along the width, the length, and the thickness thereof. The conductor patterns 140a and 140b and other printed wiring patterns are made of a material which hardly enables cutting even when the film 150 is bent according to a distortion of the tire.

Figure 4:
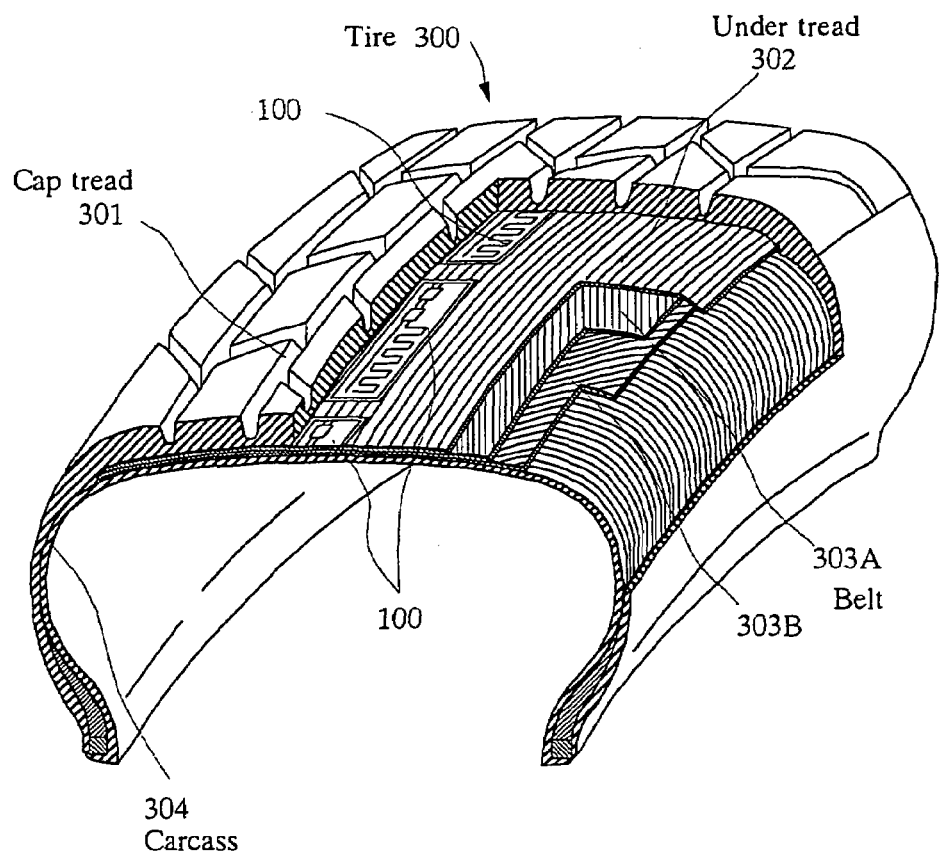
FIG. 4 is a cutaway view showing a state of embedding the sensor units in the tire according to Embodiment 1 of the present invention.

Further, the IC chip constituting the energy conversion section 120 and the IC chip constituting the oscillation section 130 are bonded to the two films 150 via a flexible resin. As shown in FIG. 4, the two or more sensor units 100 configured thus are embedded at regular intervals in the circumferential direction of the tire 300.

In the present embodiment, the sensor units 100 are embedded between a cap tread 301 and an under tread 302 so as to stretch in the circumferential direction of the tire. The sensor units 100 may be embedded between the under tread 302 and a belt 303A, between the belt 303A and a belt 303B, or between the belt 303B and a carcass 304.

As described above, in the present embodiment, the influence of the belts 303A and 303B, which have reinforcing metal wires woven therein, is reduced by using a frequency of 2.45 GHz as the first and second frequencies. Thus, the sensor units 100 can be disposed in any layers of the tire. In this way, in order to reduce the influence of metals such as the reinforcing metal wires in the tire, it is preferable to use a frequency of 1 GHz or higher as the first and second frequencies.

Further, at least four sensor units 100 are preferably embedded in the tire 300 when being disposed at regular intervals in the circumferential direction of the tire 300. According to experimental results, a distortion of the tire can be sufficiently detected by using four to eight sensor units 100.

Figure 5:
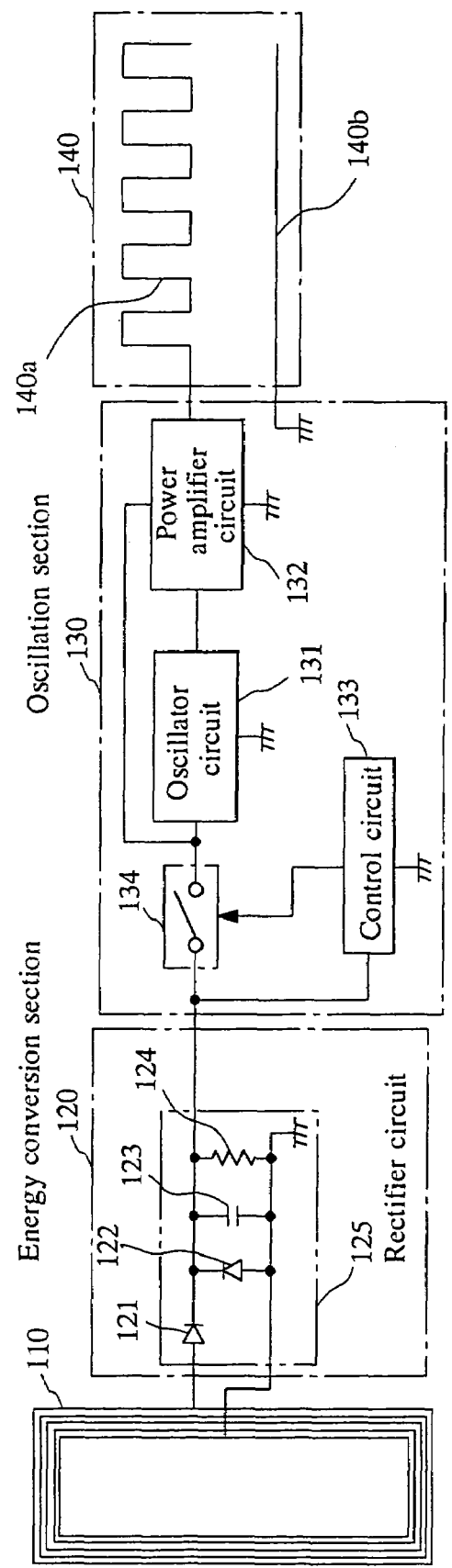
FIG. 5 is a structural diagram showing a specific example of an electrical circuit of the sensor unit according to Embodiment 1 of the present invention.

A specific example of the electric circuit of the sensor unit 100 is shown in FIG. 5. In the example of FIG. 5, the energy conversion section 120 is constituted of a known rectifier circuit 125 which is composed of diodes 121 and 122, a capacitor 123, and a resistor 124. The loop antenna 110 is connected to the input of the rectifier circuit 125, the rectifier circuit 125 rectifies high frequency current having been induced in the antenna 110 and converts the current into direct current acting as electric energy, and the direct current is charged in the capacitor 123 used for smoothing and storage. A capacitor of 0.001 to 0.003 F (farad) is used as the capacitor 123 in the present embodiment.

Moreover, the oscillation section 130 is constituted of an oscillator circuit 131, a power amplifier circuit 132, a control circuit 133, and an electronic switch 134.

The oscillator circuit 131 is constituted of a known PLL circuit and so on and outputs a carrier wave having a frequency of 2.45 GHz when power is supplied from the energy conversion section 120 via the electronic switch 134.

The power amplifier circuit 132 is operated by power supplied from the energy conversion section 120, amplifies a carrier wave outputted from the oscillator circuit 131, and feeds the carrier wave to the antenna 140. Hence, an electromagnetic wave of 2.45 GHz is radiated from the antenna 140. As will be described later, when a distortion occurs on the conductor pattern 140a like a rectangular wave that constitutes the antenna 140, the antenna 140 is changed in resonance frequency and an electromagnetic wave radiated from the antenna 140 is changed in center frequency, phase, intensity, and so on.

The control circuit 133 switches the electronic switch 134 from an off state to an on state when a voltage outputted from the energy conversion section 120 reaches a predetermined voltage or higher, e.g., 3 V or higher, so that power is supplied from the energy conversion section 120 to the oscillator circuit 131 and the power amplifier circuit 132.

Besides, it is needless to say that the sensor units 100 are embedded in the tire 300 during the manufacturing of the tire 300 and thus the IC chips and other constituent elements are so designed as to be sufficiently resistant to the heat of vulcanization.

As shown in FIG. 2, the monitoring device 200 is constituted of a radiation unit 210, a receiving unit 220, a control section 230, an operation section 240, and an arithmetic section 250.

The radiation unit 210 is constituted of an antenna 211, which radiates an electromagnetic wave having the predetermined frequency (the first frequency) of 2.45 GHz and an oscillation section 212. In response to an instruction from the control section 230, the radiation unit 210 radiate an electromagnetic wave of the first frequency from the antenna 211.

Figure 6:
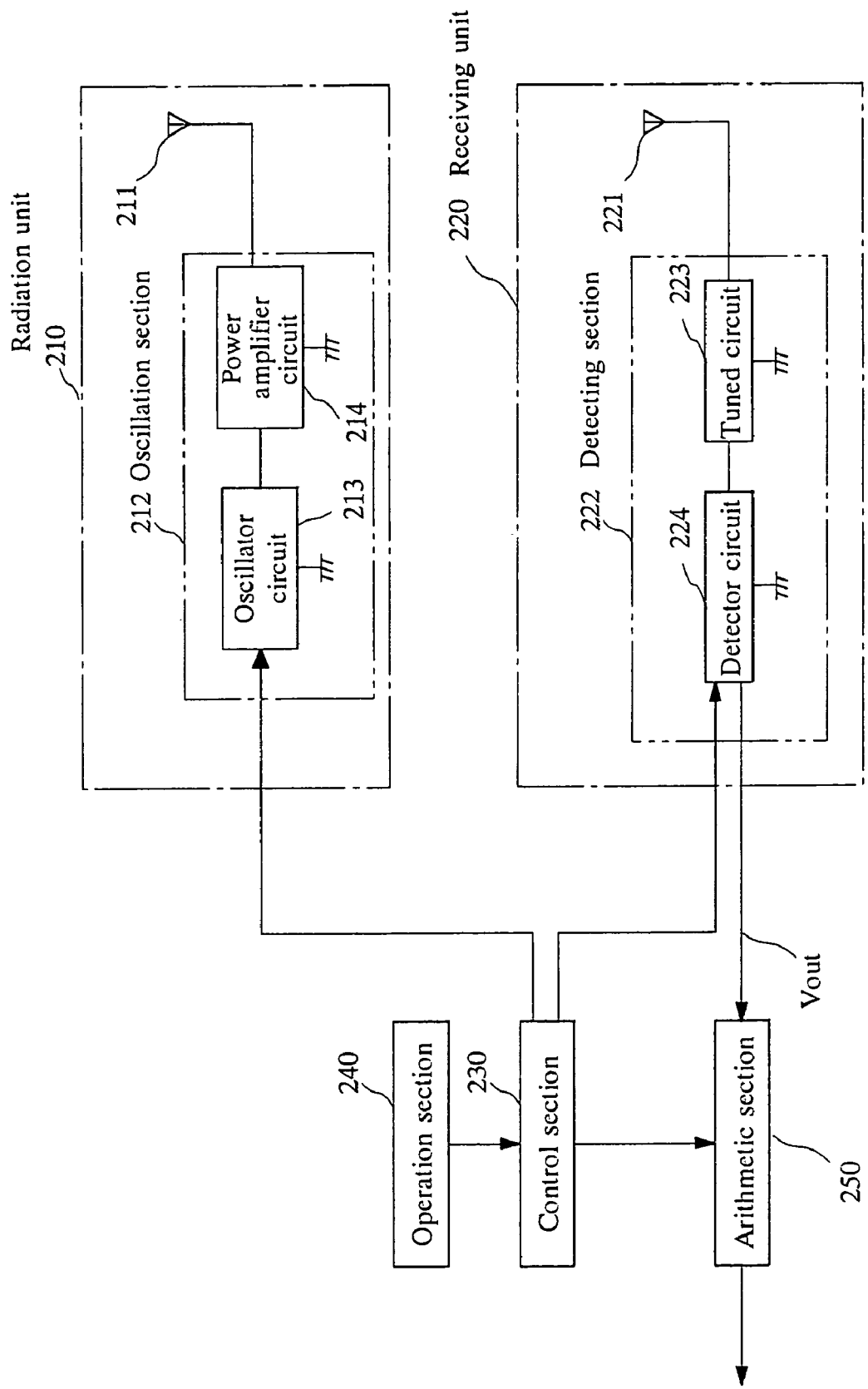
FIG. 6 is a structural diagram showing a specific example of an electrical circuit of a monitoring device according to Embodiment 1 of the present invention.

As an example of the oscillation section 212, FIG. 6 shows the oscillation section 212 constituted of an oscillator circuit 213 and a power amplifier circuit 214.

The oscillator circuit 213 is constituted of a known PLL circuit and so on and outputs a carrier wave of 2.45 GHz in response to an instruction from the control section 230.

The power amplifier circuit 214 amplifies a carrier wave having been outputted from the oscillator circuit 213 and feeds the carrier wave to the antenna 211. Thus, an electromagnetic wave of 2.45 GHz is radiated from the antenna 211. Additionally, high frequency power outputted from the power amplifier circuit 214 is set at a value enabling the supply of electric energy to the sensor units 100 in the range of a distance L1, the range being formed around the monitoring device 200 (the antenna 211 for radiating an electromagnetic wave) as shown in FIG. 1. Thus, it is possible to detect a partial distortion of the tire 300 in the range of the distance L1, the range being formed around the antenna 211 for radiating an electromagnetic wave of the monitoring device 200, for example, in the range of an upper angle θ (e.g. 90°) that is formed around the axis of rotation of the tire 300.

The receiving unit 220 is constituted of an antenna 221, which receives an electromagnetic wave having the predetermined frequency (the second frequency) of 2.45 GHz, and a detecting section 222. In response to an instruction from the control section 230, the receiving unit 220 converts the high frequency energy of the electromagnetic wave, which is received by the antenna 221 and has a frequency band with a predetermined width including the second frequency, into electric energy and outputs the energy as a detection voltage Vout.

As an example of the detecting section 222, FIG. 6 shows the detecting section 222 constituted of a turned circuit 223 and a detector circuit 224.

Figure 7:
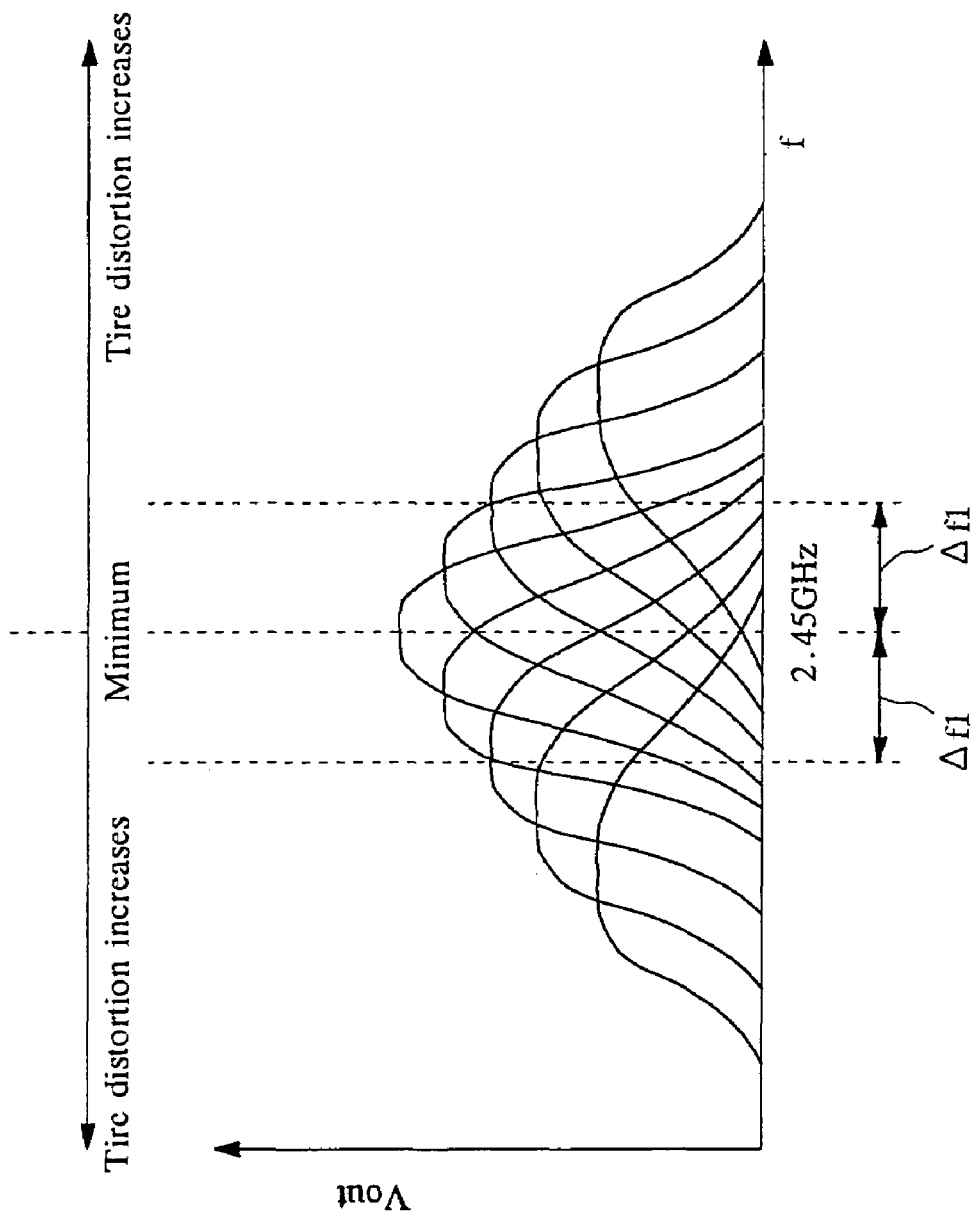
FIG. 7 is a diagram showing the relationship between a detection voltage and a frequency according to Embodiment 1 of the present invention.

As shown in FIG. 7, the tuned circuit 223 is tuned to an electromagnetic wave in a frequency band of ±Δf1 having its center at the second frequency (2.45 GHz in the present embodiment), and the turned circuit 223 converts the high frequency energy of the electromagnetic wave into electric energy, e.g., alternating voltage and outputs the voltage.

The detector circuit 224 converts the alternating voltage having been outputted from the tuned circuit 223 into direct-current voltage and outputs the voltage as the detection voltage Vout.

The control section 230 drives the oscillation section 212 and radiates an electromagnetic wave for a predetermined time t1 when receiving an initial setting instruction from the operation section 240. Thereafter, the control section 230 drives the detecting section 222 to output the detection voltage Vout during a predetermined time t2, and the control section 230 causes the arithmetic section 250 to store the value of the detection voltage Vout as a reference voltage Vstd.

In the present embodiment, the radiation time t1 of the monitoring device 200 is set at 0.15 ms and the receiving time t2 is set at 0.30 ms. In the present embodiment, an electromagnetic wave is radiated from the radiation unit 210 for the time t1, so that a voltage of 3 V or higher can be stored in the energy conversion section 120 of the sensor unit 100 provided within the distance L1. Further, it is enough for the operation section 240 to output a signal for providing the control section 230 with an initial setting instruction. In the present embodiment, the operation section 240 is constituted of a momentary switch.

Thereafter, the control section 230 similarly drives the oscillation section 212 to radiate an electromagnetic wave and outputs the detection voltage Vout to the detecting section 222. Moreover, the control section 230 repeats an operation of calculating a difference between the stored reference voltage Vstd and the detection voltage Vout and outputting the difference to a host device (not shown).

A difference between the reference voltage Vstd and the detection voltage Vout, which is outputted from the operation section 250, is changed according to a distortion of the tire 300. That is, as described above, the conductor pattern 140a of the sensor unit 100 is distorted according to a distortion of the tire 300 and thus the shape of the conductor pattern 140a is changed, so that an electromagnetic wave radiated from the conductor pattern 140a is changed in phase, intensity, and frequency. For example, as shown in FIG. 7, an electromagnetic wave radiated from the sensor unit 100 is changed in frequency. Hence, in a frequency band from (2.45 GHZ−Δf1) to (2.45 GHz+Δf1) that is set for the tuned circuit 223 of the monitoring device 200, the amount of energy of an electromagnetic wave is changed according to a distortion of the tire 300. The detection voltage Vout has the maximum value when the tire has the minimum distortion, i.e., when the reference voltage Vstd is detected. The detection voltage Vout decreases as the tire 300 has a larger distortion. Therefore, a difference (Vstd−Vout) between the reference voltage Vstd and the detection Vout, which is outputted from the operation section 250, is changed according to a distortion of the tire 300, so that a distortion of the tire 300 can be detected by the difference (Vstd−Vout).

As described above, the sensor units 100 are embedded in the tire 300 during the manufacturing of the tire 300 and thus the IC chips and the other constituent elements are so designed as to be sufficiently resistant to the heat of vulcanization. Thus, there is quite a low probability that a deterioration and a damage are caused by heat generated on the tire during the running of a vehicle, thereby achieving high reliability and durability.

Figure 8:
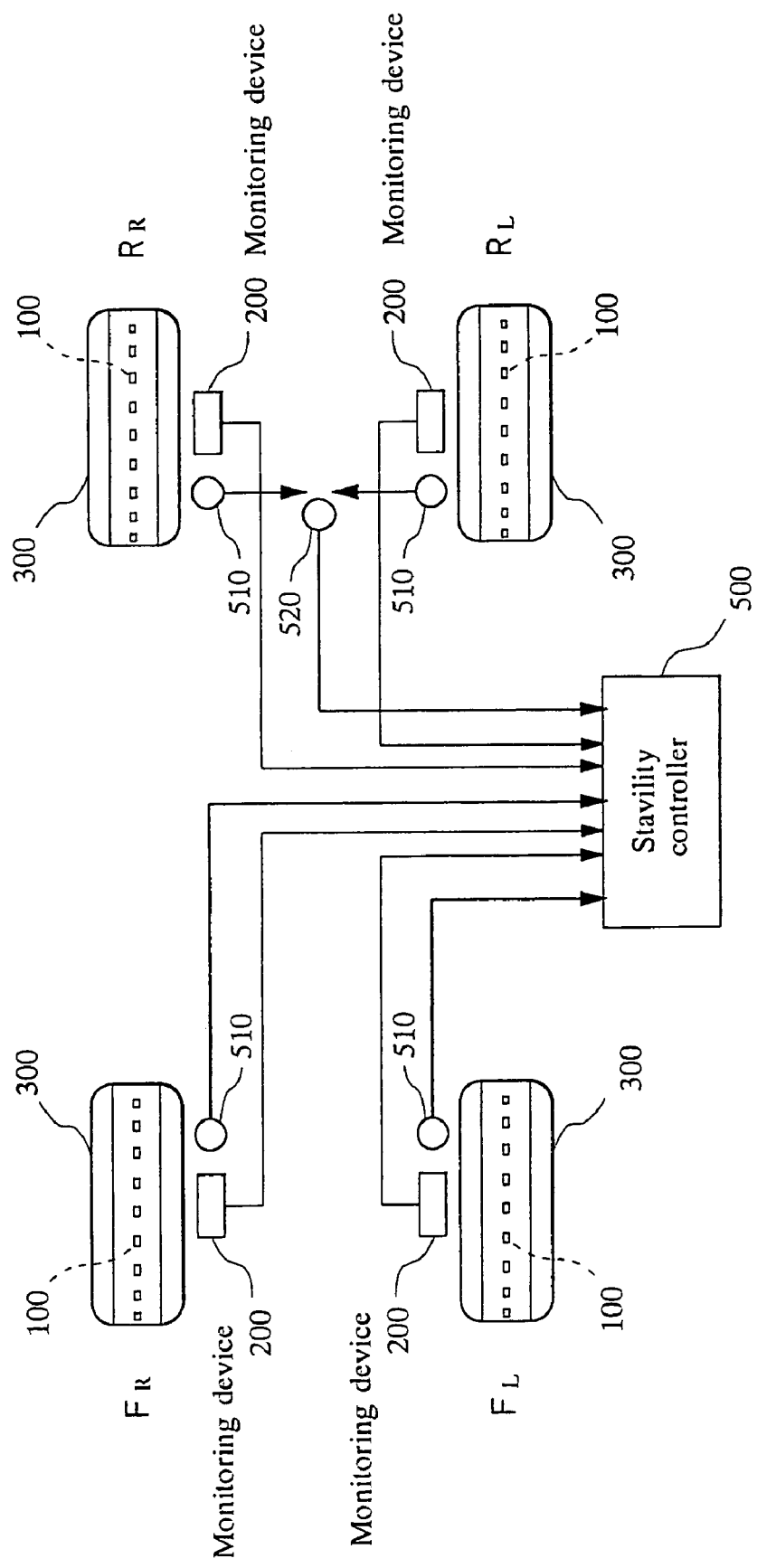
FIG. 8 is a diagram for explaining a use example of the tire distortion detector according to Embodiment 1 of the present invention.

The tire distortion detector is applicable to, for example, a stability controller 500 shown in FIG. 8. A conventional and typical stability controller captures detection results outputted from sensors 510 and 520, which detect the number of revolutions of the tire 300 attached to the vehicle, to perform stability control. By adding the stability controller 500 to the conventional configuration, it is possible to perform control with higher accuracy. The stability controller 500 comprises the monitoring device 200 and the tire 300 having the sensor units 100 and performs stability control by capturing detection results on a distortion of the tire 300 that are outputted from the monitoring device 200. In this case, the operation section 240 of the monitoring device 200 may be interlocked with the ignition key of the vehicle and the reference voltage Vstd may be detected at the start of the vehicle.

Additionally, as described above, the present embodiment enables the detection of a partial distortion of the tire 300 in the range of the distance L1, the range being formed around the antenna 211 for radiating an electromagnetic wave of the monitoring device 200. However, most members constituting the tire 300 are made of a rubber and thus from a portion making contact with a road surface with the largest distortion, a distortion propagates through the constituent elements of the tire to the upper part of the tire 300. Hence, it is also possible to estimate a distortion of the tire 300 on a part where the tire 300 and the road surface make contact with each other, according to the detection results on a distortion in the range of the distance L1.

Figure 9:
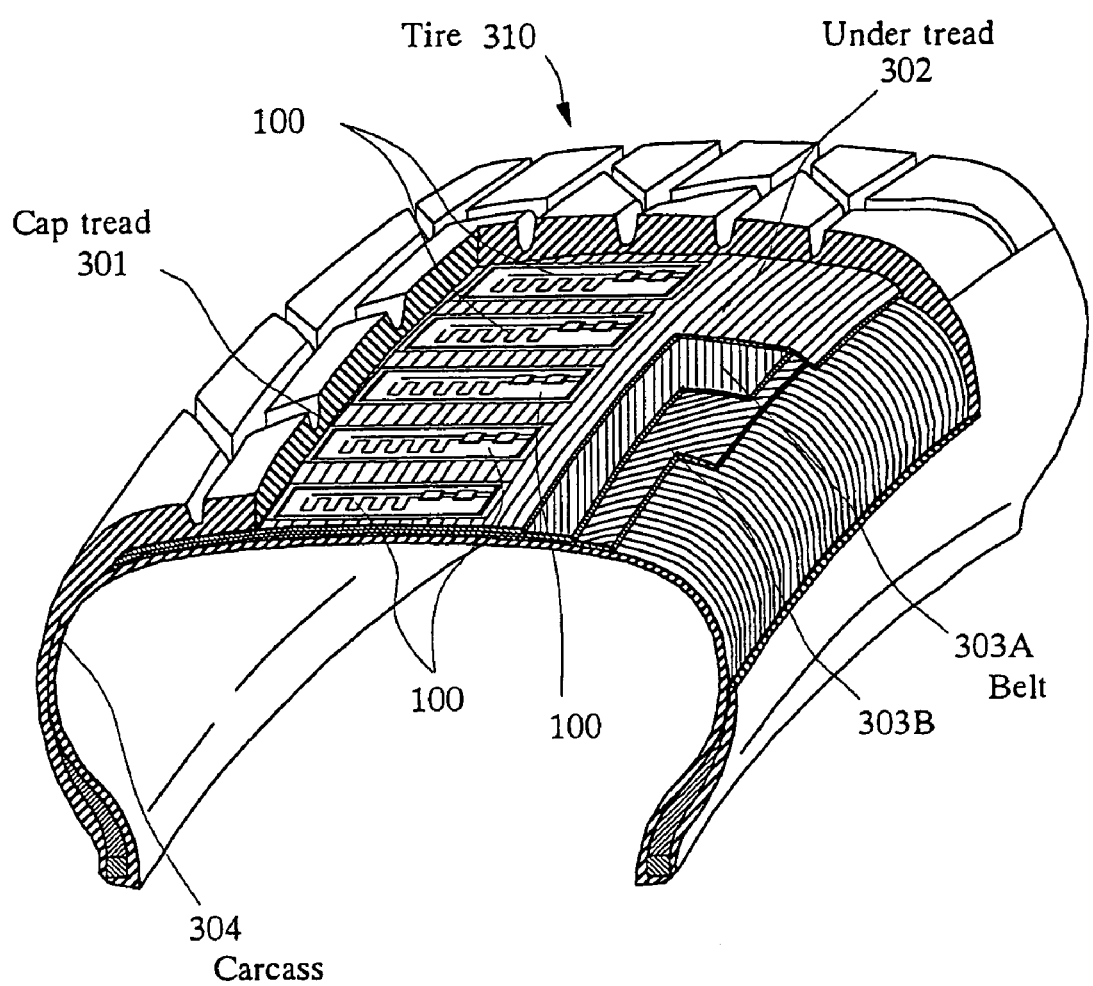
FIG. 9 is a cutaway view showing another example of a state of embedding the sensor units in the tire according to Embodiment 1 of the present invention.

In the present embodiment, the sensor units 100 are embedded so as to stretch in the circumferential direction of the tire. A distortion of the tire can be detected as in the present embodiment also by using a tire 310 configured as shown in FIG. 9, in which the sensor units 100 are embedded so as to stretch in the width direction of the tire.

Figure 10:
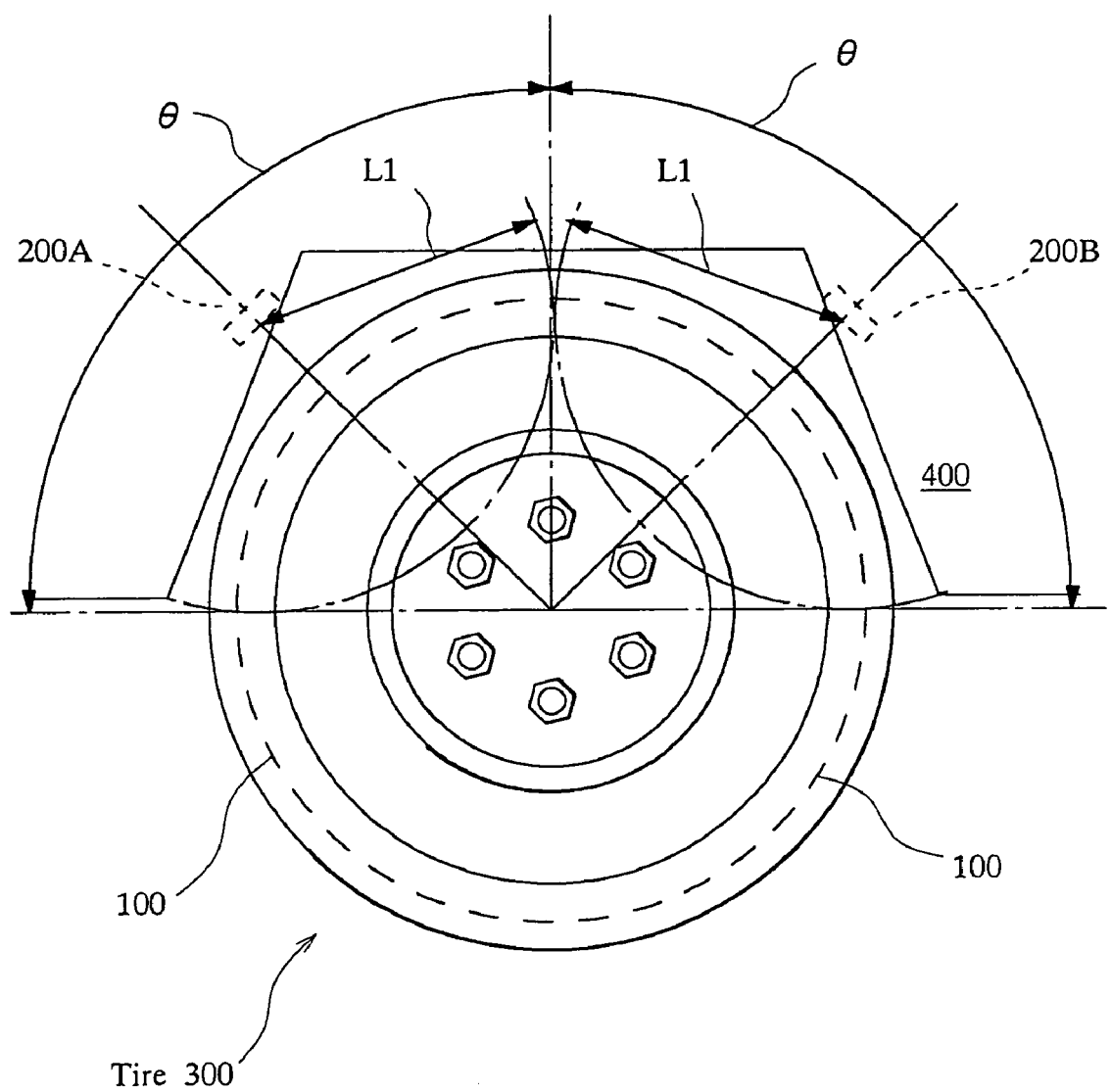
FIG. 10 is a diagram showing another example of a state of mounting the monitoring device according to Embodiment 1 of the present invention.

Further, as shown in FIG. 10, two monitoring devices 200A and 200B may be provided at the front and back of the upper part of the tire house 400. In this case, an electromagnetic wave is radiated and received in a time-sharing manner by the monitoring devices 200A and 200B. Thus, the monitoring device 200A can detect a distortion of the tire in the range of the angle θ (e.g., 90°) from a horizontal position of the upper front part, the range being formed around the axis of rotation of the tire 300. Moreover, the other monitoring device 200B detects a distortion of the tire in the range of the angle θ (e.g., 90°) from a horizontal position of the upper rear part, the range being formed around the axis of rotation of the tire 300.

Further, it is needless to say that the distance L1 can be changed by varying the high frequency power and the phase of an electromagnetic wave radiated from the monitoring device 200.

Embodiment 2 of the present invention will be described below.

Figure 11:
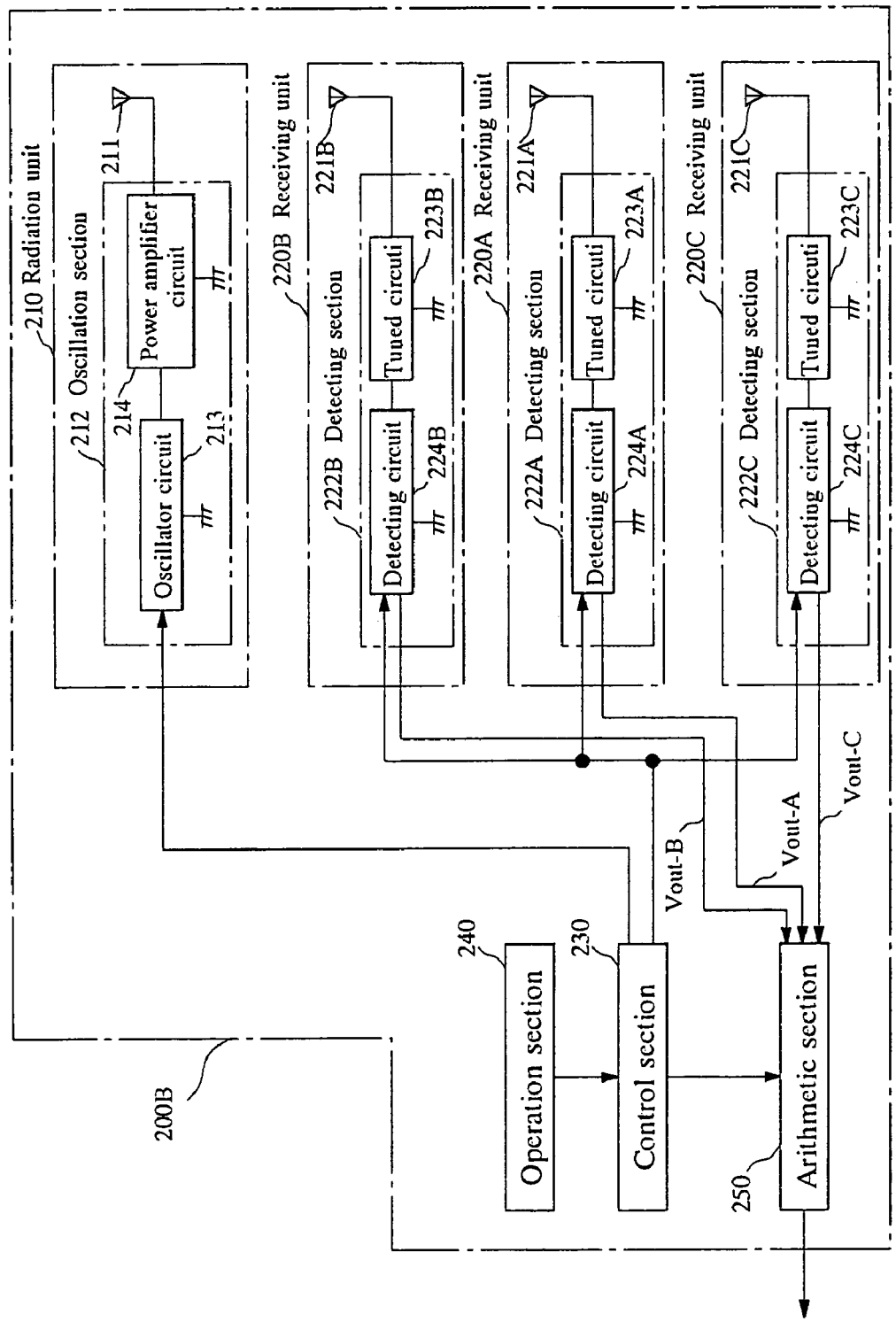
FIG. 11 is a structural diagram showing a specific example of an electrical circuit of a monitoring device according to Embodiment 2 of the present invention.

FIG. 11 is a structural diagram showing an electric circuit of a monitoring device according to Embodiment 2 of the present invention. In FIG. 11, the same constituent elements as Embodiment 1 are indicated by the same reference numerals and the explanation thereof is omitted. In Embodiment 2, the arrangement of a monitoring device 200 and the configurations of a sensor unit 100 and a tire 300 are similar to those of Embodiment 1.

In the monitoring device 200 of Embodiment 2, a receiving unit 220 comprises three antennas 221A to 221C and three detecting sections 222A to 222C respectively connected to the antennas. A distortion of the tire 300 is detected by capturing detection voltages Vout-A to Vout-C which are outputted from the detecting sections 222A to 222C by an arithmetic section 250.

Figure 12:
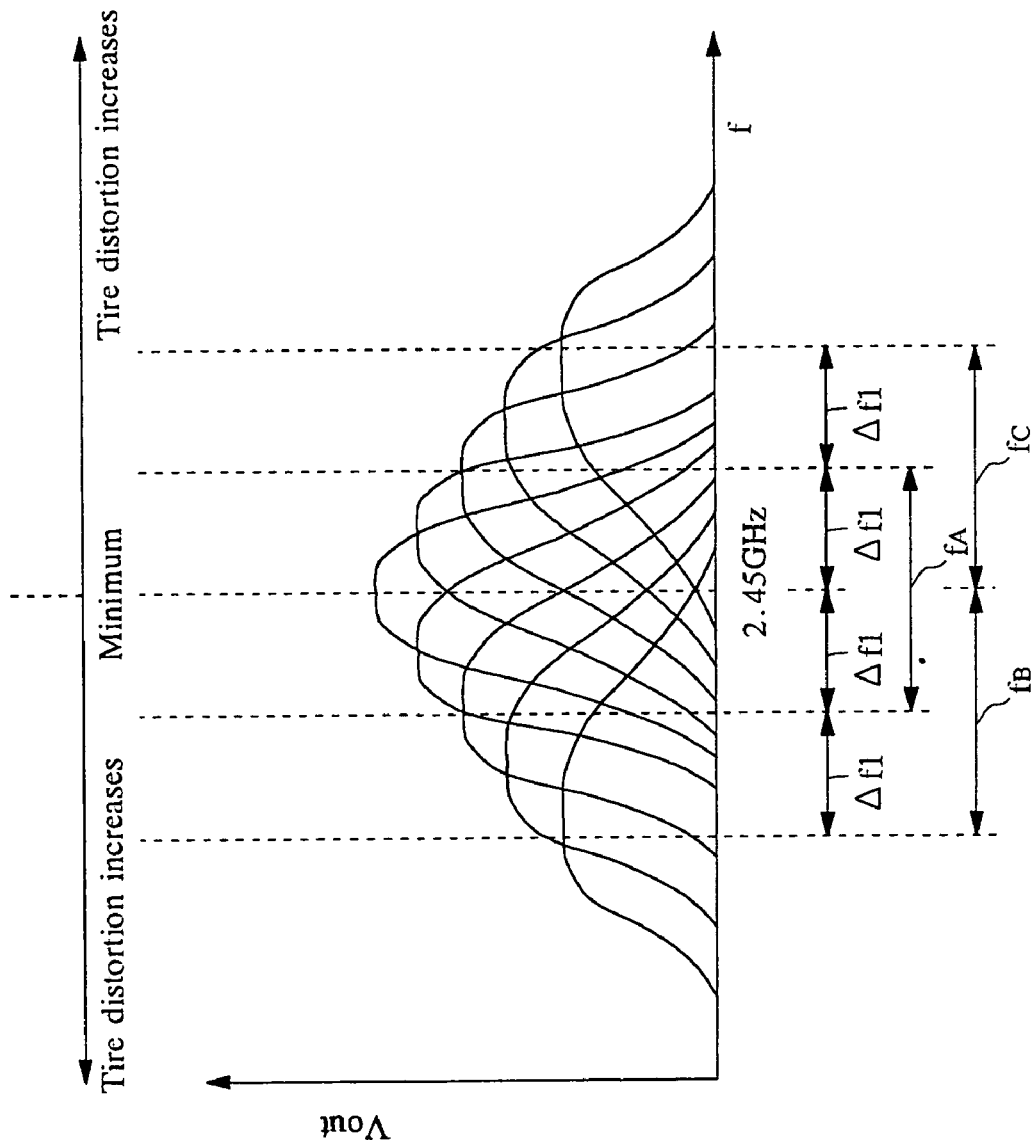
FIG. 12 is a diagram for explaining a tuning frequency of each tuned circuit of the monitoring device according to Embodiment 2 of the present invention.

The first antenna 221A and the first detecting section 222A are similar to those of Embodiment 1 and a frequency band at which the tuned circuit 223A is tuned is a frequency band $f_A$ shown in FIG. 12.

Regarding the second antenna 221B and the second detecting section 222B, a frequency band $f_B$ at which the tuned circuit 223B is tuned is shifted by Δf1 to the lower side as shown in FIG. 12.

Regarding the third antenna 221C and the third detecting section 222C, a frequency band $f_C$ at which the tuned circuit 223C is tuned is shifted by Δf1 to the higher side as shown in FIG. 12.

Further, the detector circuits 224A to 224C have similar configurations.

An arithmetic section 250 simultaneously captures detection voltages Vout-A to Vout-C outputted from the detecting sections 222A to 222C and calculates a difference (Vstd−Vout) between a reference voltage Vstd and the detection voltage Vout outputted from the first detecting section 222A as in the case of Embodiment 1. Moreover, by comparing the detection voltages Vout-A to Vout-C outputted from the detecting sections 222A to 222C, the arithmetic section 250 detects whether the frequency of a received electromagnetic wave is shifted to the lower side or the higher side. A change in the distortion of the tire can be detected according to the shift of the frequency.

Further, a known AFC circuit is also applicable as a method of more specifically detecting a change in the frequency of an electromagnetic wave radiated from the sensor unit 100.

Embodiment 3 of the present invention will be described below.

Figure 13:
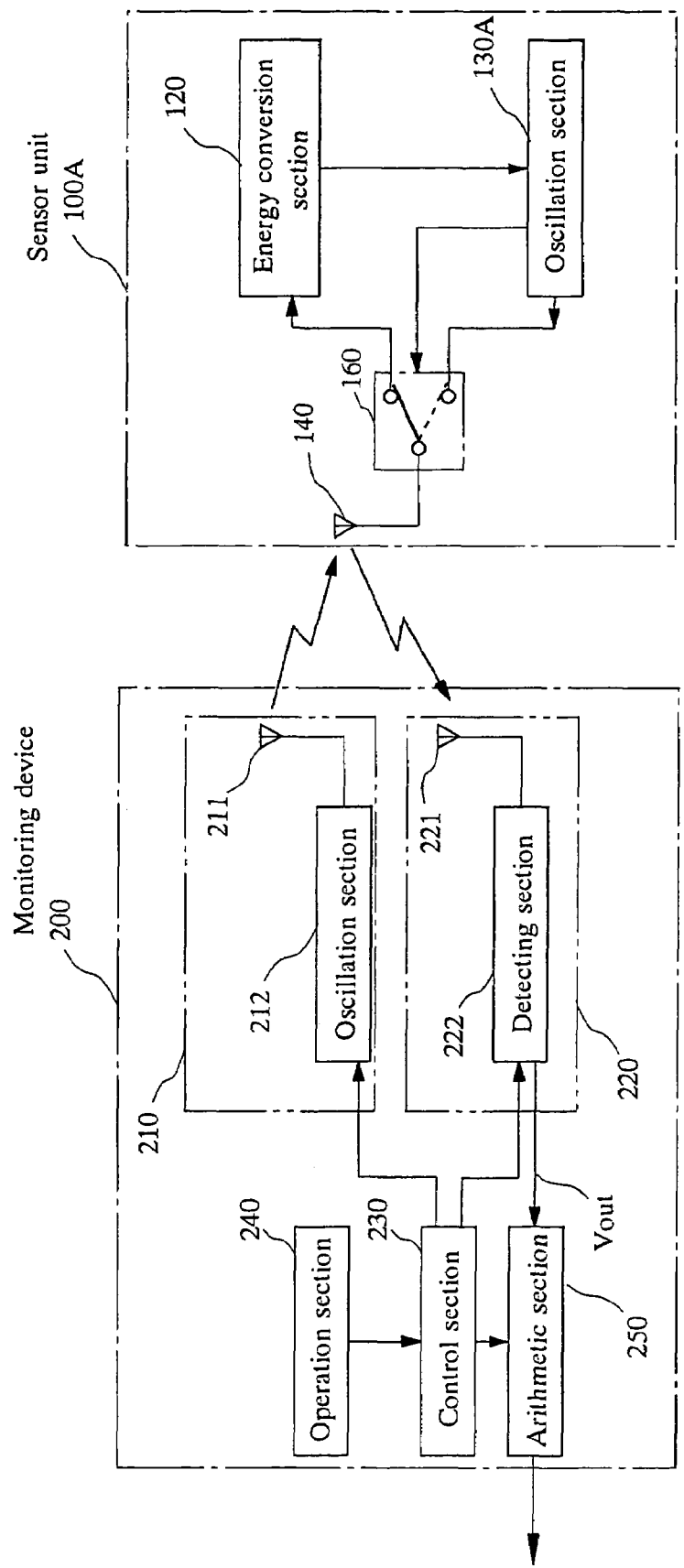
FIG. 13 is a structural diagram showing a tire distortion detector according to Embodiment 3 of the present invention.
Figure 14:
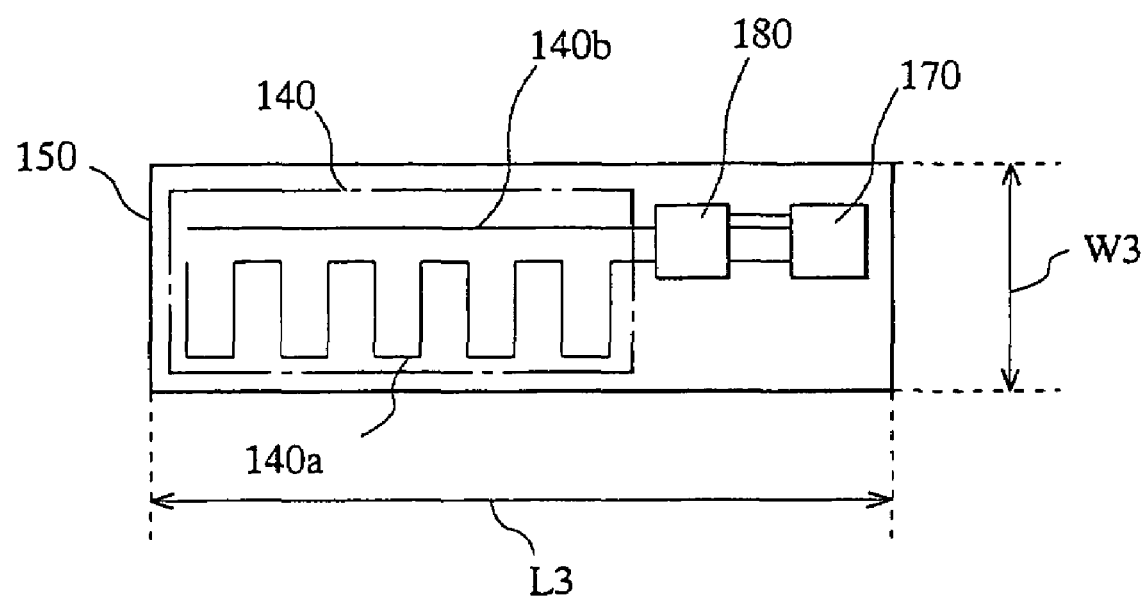
FIG. 14 is a plan view showing a sensor unit according to Embodiment 3 of the present invention.
Figure 15:
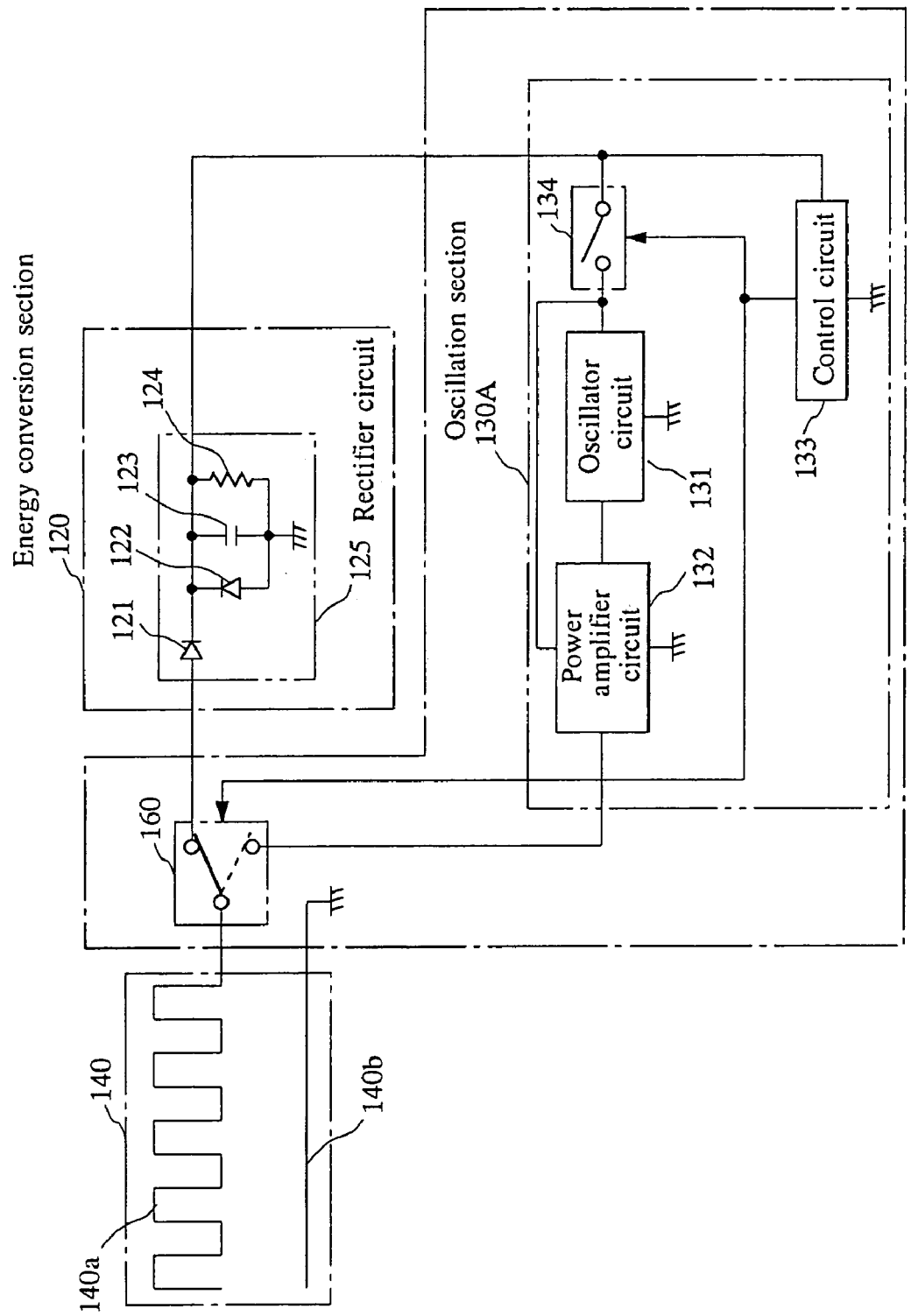
FIG. 15 is a structural diagram showing an example of an electric circuit of the sensor unit according to Embodiment 3 of the present invention.

FIG. 13 is a structural diagram showing a tire distortion detector according to Embodiment 3 of the present invention. FIG. 14 is a plan view showing a sensor unit according to Embodiment 3 of the present invention. FIG. 15 is a structural diagram showing an example of an electric circuit of the sensor unit according to Embodiment 3. In FIGS. 13 to 15, the same constituent elements as Embodiment 1 are indicated by the same reference numerals and the explanation thereof is omitted. A difference between Embodiment 1 and Embodiment 3 is that Embodiment 3 comprises sensor units 100A instead of the sensor units 100 of Embodiment 1.

In the sensor unit 100A of Embodiment 3, the loop antenna 110 of Embodiment 1 is omitted and an electromagnetic wave is radiated and received by an antenna 140.

The sensor unit 100A is constituted of an energy conversion section 120, an oscillation section 130A, the antenna 140, and an electronic switch 160 for connecting the antenna 140 with the energy conversion section 120 or the oscillation section 130A.

The electronic switch 160 connects the antenna 140 to the energy conversion section 120 in the initial state, and connects the antenna 140 to the oscillation section 130A when the energy conversion section 120 stores electric energy of a predetermined value or higher.

As shown in FIG. 14, the sensor unit 100A is configured so that two IC chips 170 and 180 and the antenna 140 are sandwiched between two films 150. The antenna 140 is composed of a conductor pattern 140a shaped like a rectangular wave and a conductor pattern 140b shaped like a straight line.

The film 150 is composed of, for example, a polyimide film having a width (W3) of 3 mm and a length (L3) of 16 mm. The antenna 140 is formed on the lower film by printing. The conductor pattern 140a shaped like a rectangular wave and the conductor pattern 140b shaped like a straight line are disposed in such a manner as to stretch along the length (L3) of the film 150.

The IC chip 170 constitutes the energy conversion section 120 and the other IC chip 180 constitutes the oscillation section 130A and the electronic switch 160.

The IC chip 180 constituting the oscillation section 130A and the electronic switch 160 is disposed between the antenna 140 and the IC chip 170 and is connected to both of the antenna 140 and the IC chip 170.

A specific example of the electric circuit of the sensor unit 100A is shown in FIG. 15. In FIG. 15, the same constituent elements as the sensor unit 100 of Embodiment 1 are indicated by the same reference numerals and the explanation thereof is omitted. In the sensor unit 100A of Embodiment 3, an on/off switching control signal of an electronic switch 134 is used as a switching control signal of the electronic switch 160 in the oscillation section 130A.

When the energy conversion section 120 outputs a voltage of a predetermined value or higher, e.g., a voltage of 3 V or higher, the control circuit 133 switches the electronic switch 134 from an off state to an on state to supply power from the energy conversion section 120 to an oscillation circuit 131 and a power amplifier circuit 132, and the control circuit 133 switches the electronic switch 160 to connect the antenna 140 and the output of a power amplifier circuit 132.

With the sensor unit 100A configured thus, the shape of the sensor unit 100 can be reduced.

Embodiment 4 of the present invention will be described below.

Figure 16:
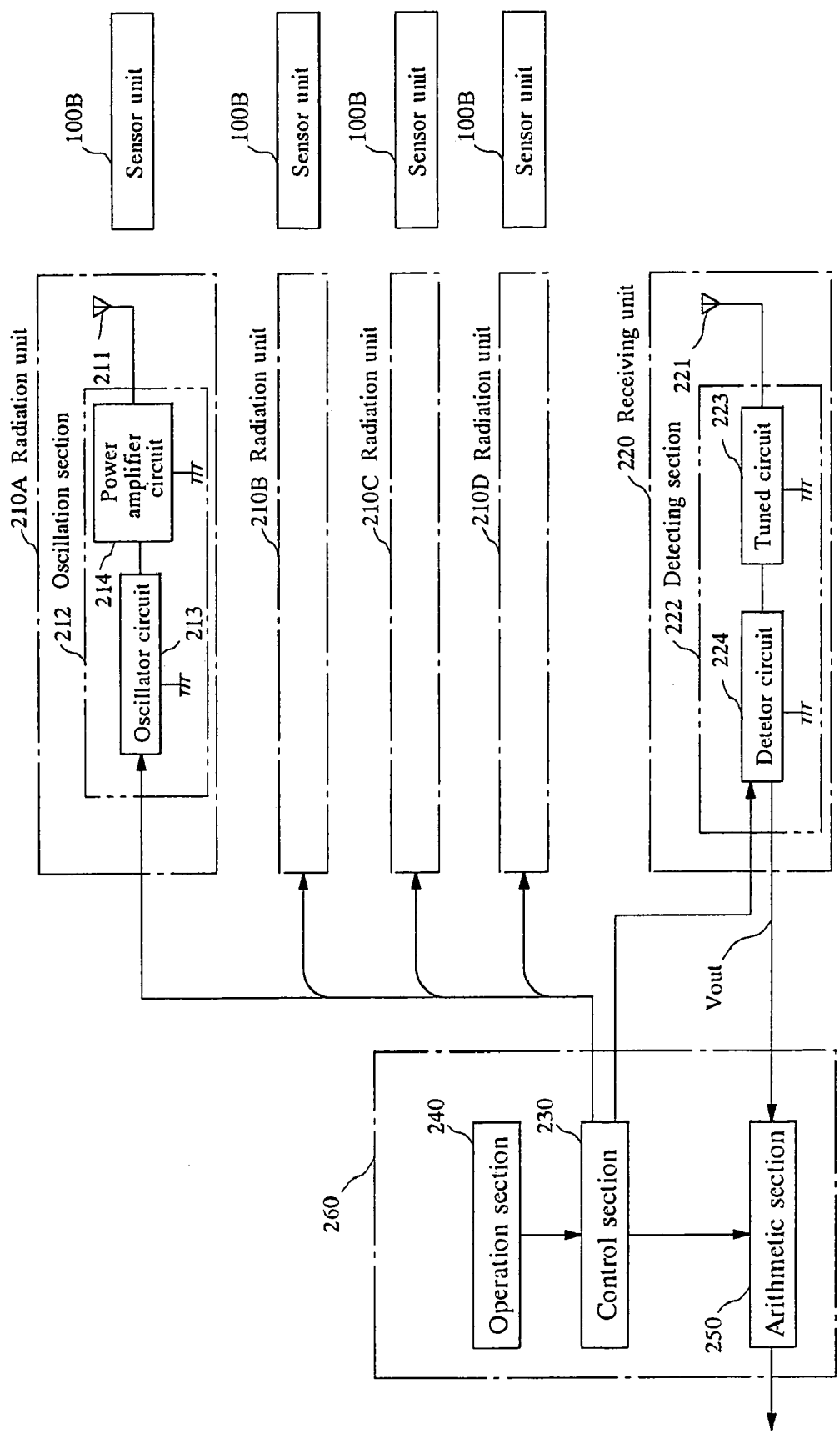
FIG. 16 is a structural diagram showing a tire distortion detector according to Embodiment 4 of the present invention.
Figure 17:
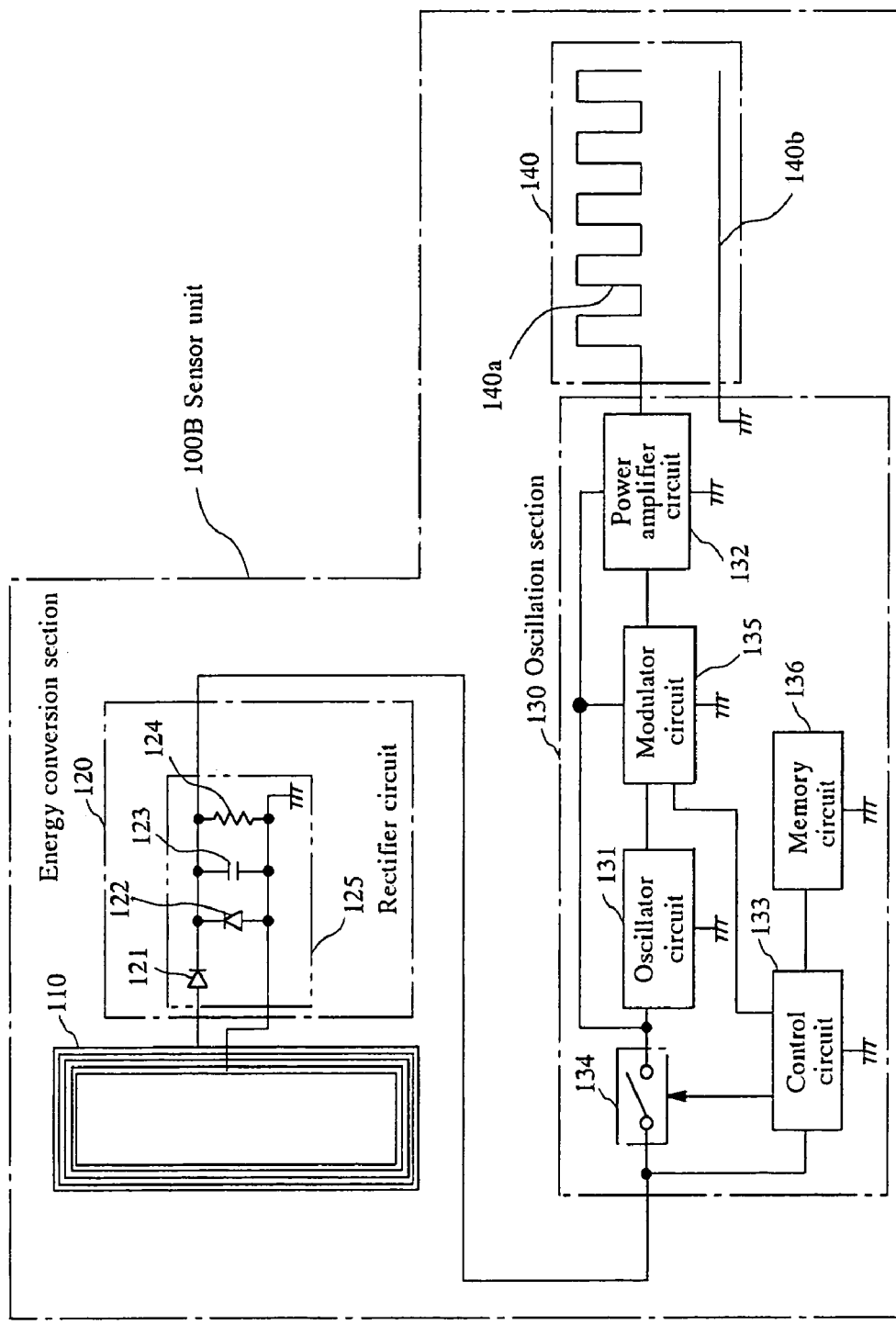
FIG. 17 is a structural diagram showing a specific example of an electric circuit of the sensor unit according to Embodiment 4 of the present invention.

FIG. 16 is a structural diagram showing a tire distortion detector according to Embodiment 4 of the present invention. FIG. 17 is a structural diagram showing a specific example of an electric circuit of a sensor unit. In FIGS. 16 and 17, the same constituent elements as Embodiment 1 are indicated by the same reference numerals and the explanation thereof is omitted. A difference between Embodiment 1 and Embodiment 4 is that an oscillation section 130B of a sensor unit 100B comprises a modulator circuit 135 and a memory circuit 136 and a monitoring device 200B comprises four radiation units 210A to 210D in Embodiment 4.

As shown in FIG. 17, in the sensor unit 100B, the modulator circuit 135 connects an oscillator circuit 131 and a power amplifier circuit 132. The modulator circuit 135 modulates a carrier wave, which is outputted from the modulator circuit 131, in response to a signal (a signal indicating identification information) inputted from a control circuit 133.

The memory circuit 136 is connected to the control circuit 133 and stores identification information specific to each of the sensor units 100B. The identification information is stored when the sensor units 100B are manufactured.

Further, when an electromagnetic wave is radiated from an oscillation section 130B, the control circuit 133 outputs the signal indicating identification information stored in the memory circuit 136 to the modulator circuit 135, modulates the electromagnetic wave in response to the signal indicating the identification information, and radiates the modulated electromagnetic wave.

Therefore, the sensor unit 100B transmits identification information specific to the sensor unit 100B at two or more times when an electromagnetic wave is radiated.

The sensor units 100B are embedded in a tire 300 in the same manner as the foregoing specific example.

The monitoring device 200B is constituted of the four radiation units 210A to 210D, a receiving unit 220, and a monitoring device main unit 260.

Figure 18:
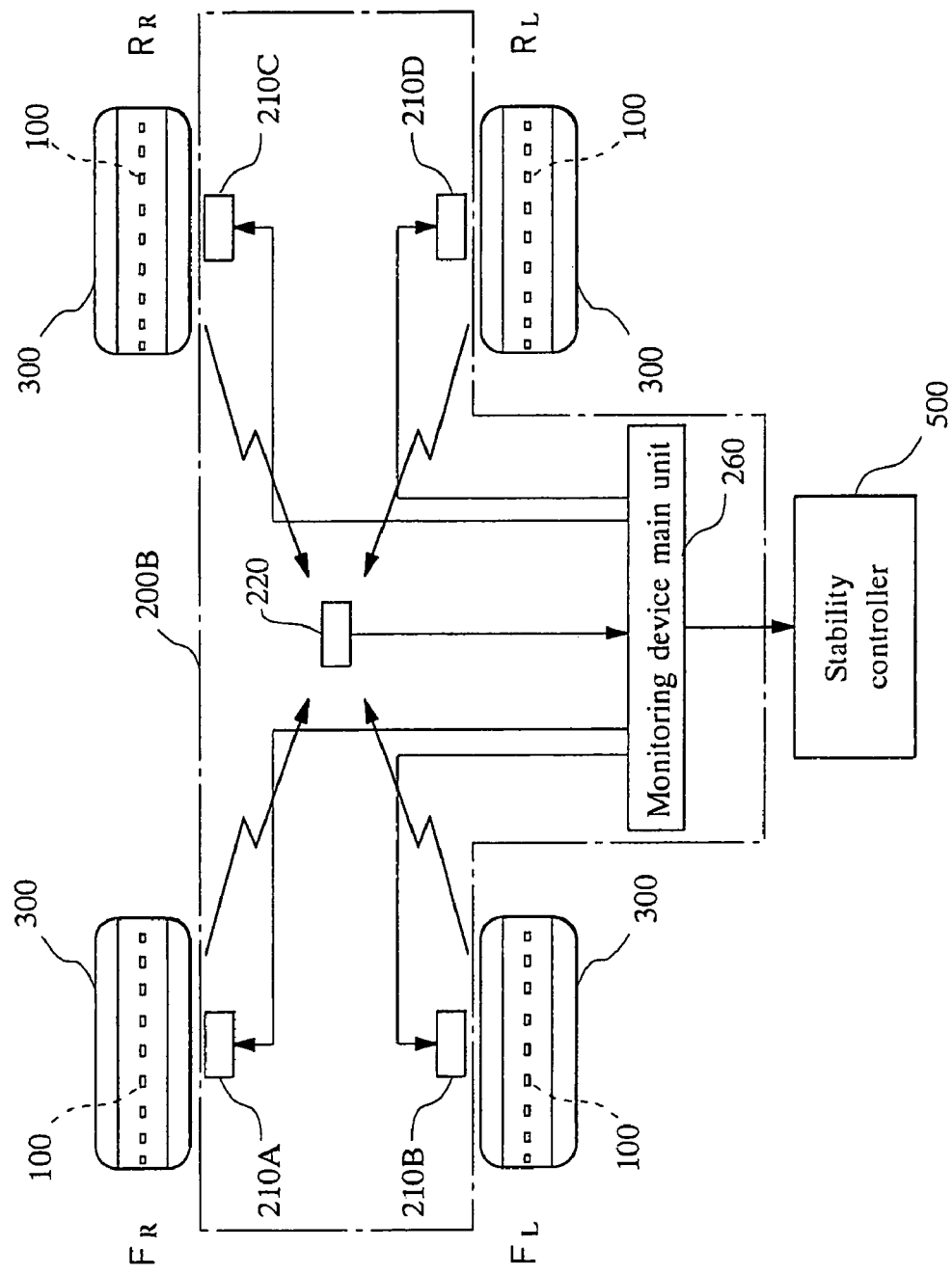
FIG. 18 is a diagram for explaining a use example of the tire distortion detector according to Embodiment 4 of the present invention.

The four radiation units 210A to 210D are each similar to the radiation unit 210 of Embodiment 1 in circuit configuration. As shown in FIG. 18, each of the four radiation units 210A to 210D is provided on the same position as the mounting position of the monitoring device 200, in a tire house 400 for each of the tires 300.

Further, the receiving unit 220 of the monitoring device 200B is disposed on a position for receiving electromagnetic waves radiated from the sensor units 100B in the tires 300 of a vehicle.

As shown in FIG. 16, the monitoring device main unit 260 is constituted of a control section 230B, an operation section 240, and an arithmetic section 250B. Moreover, the control section 230B and the arithmetic section 250B are composed of a single CPU and a single program.

Figure 19:
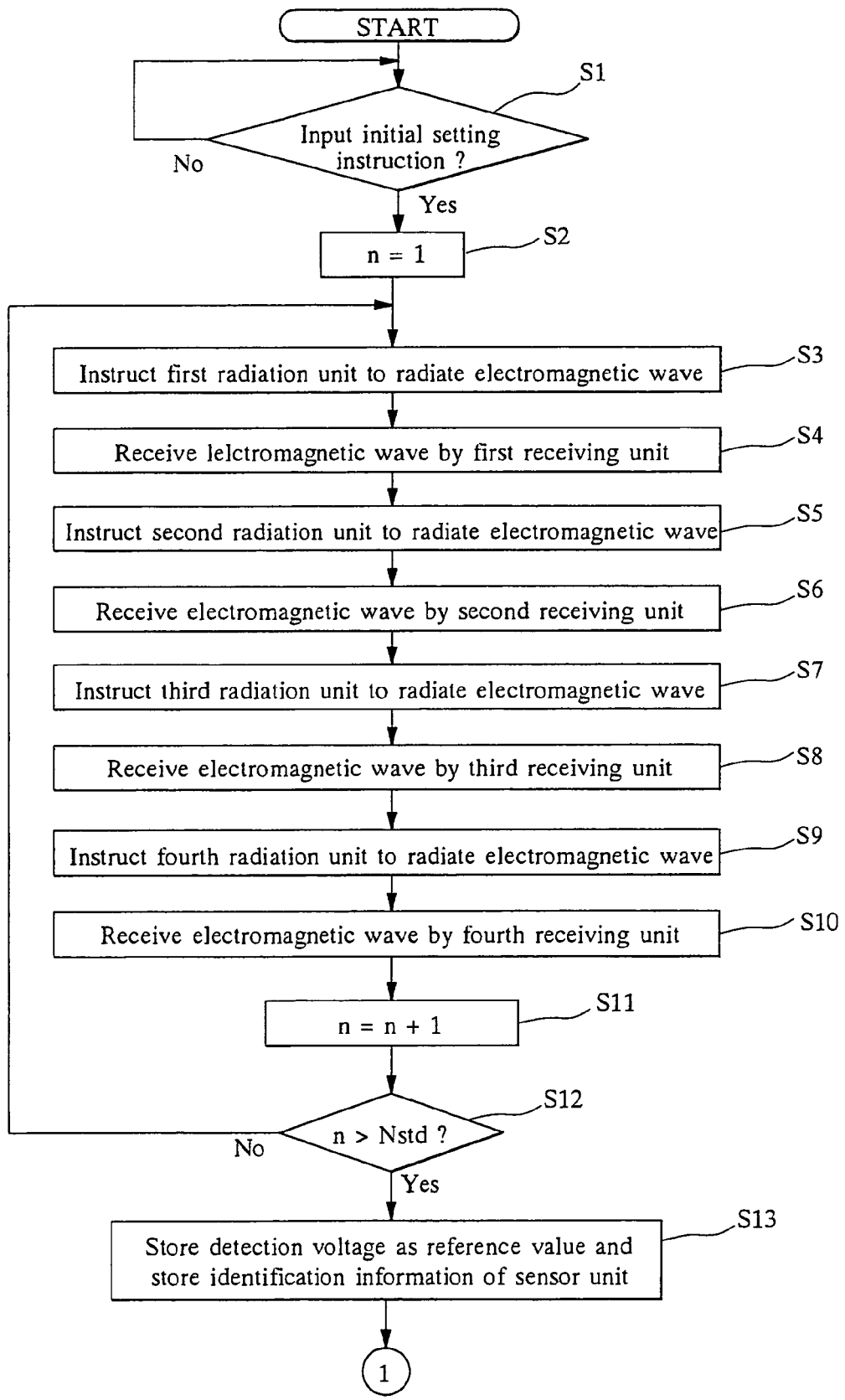
FIG. 19 is a flowchart for explaining the control and an arithmetic operation of the main unit of a monitoring device according to Embodiment 4 of the present invention.
Figure 20:
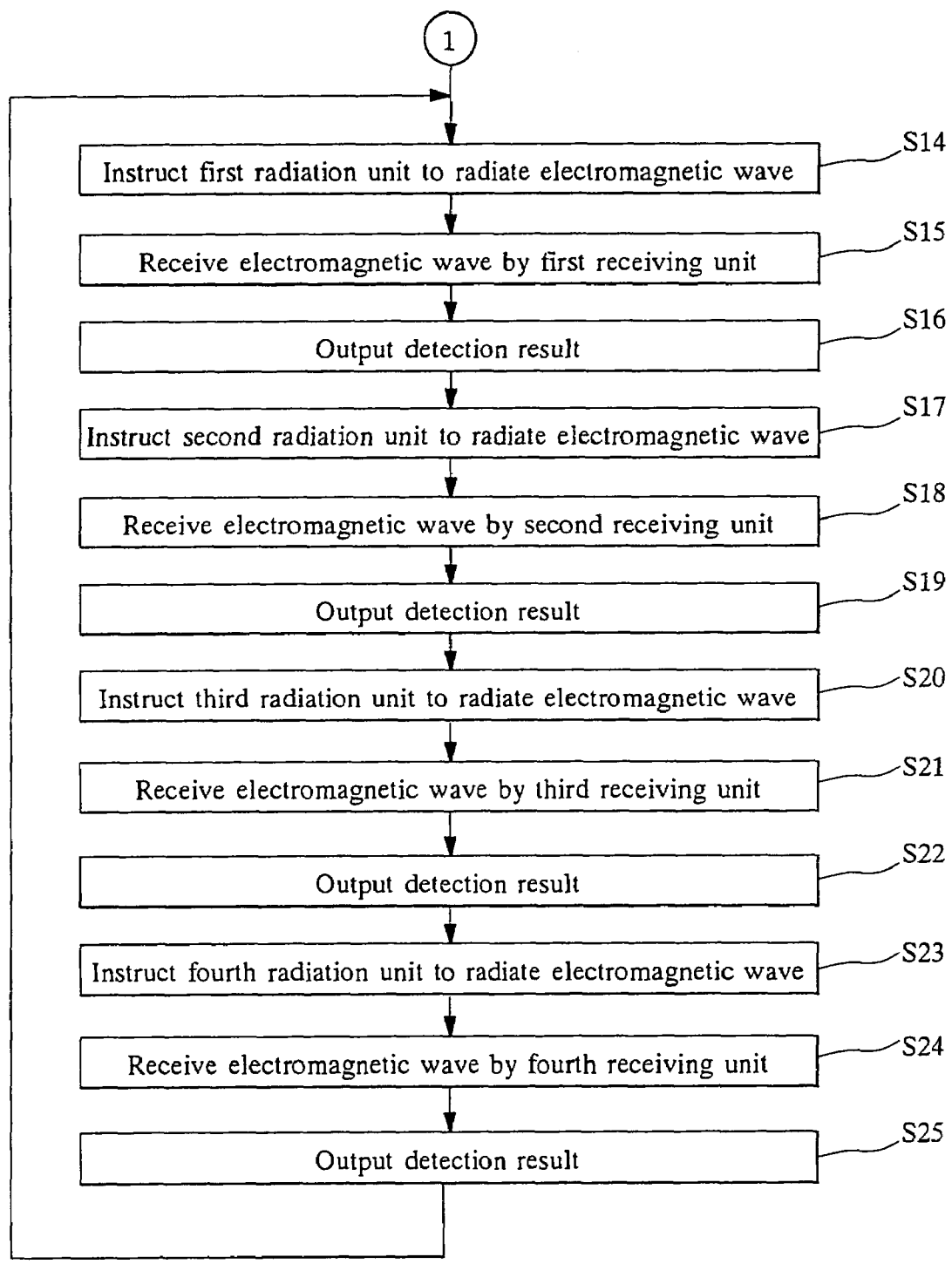
FIG. 20 is a flowchart for explaining the control and an arithmetic operation of the main unit of the monitoring device according to Embodiment 4 of the present invention.

As shown in the flowcharts of FIGS. 19 and 20, the control section 230B radiates an electromagnetic wave from an oscillation section 212 of each of the radiation units 210A to 210D for a predetermined time t1 when receiving an initial setting instruction from the operation section 240 (S1). Thereafter, for a predetermined time t2, the control section 230B repeats at two or more times (N std) an operation of driving a detecting section 222 to output a detection voltage Vout in a time sharing manner for each of the radiation units 210A to 210D (S2 to S12). Thus, the arithmetic section 250B detects the identification information of all the sensor units 100B, which are embedded in the tires 300, according to a change in the value of the detection voltage Vout, and the arithmetic section 250B stores the detected identification information in the radiation units 210A to 210D. Moreover, the arithmetic section 150B detects a reference voltage Vstd for each of the radiation units 210A to 210D and stores the reference voltage Vstd (S13).

Thereafter, the control section 230B repeatedly radiates electromagnetic waves from the first to fourth radiation units 210A to 210D and receives electromagnetic waves by using the receiving unit 220 in the same manner. Further, the control section 230B repeatedly causes the arithmetic section 250B to calculate a difference between the stored reference voltage Vstd and the detection voltage Vout, match the difference with the information indicating the radiation units 210A to 210D, and outputs the difference to a host device such as a stability controller together with the information (S14 to S25).

Also in the above configuration, a difference between the reference voltage Vstd and the detection voltage Vout that is outputted from the arithmetic section 250B is changed according to a distortion of the tire 300 as in the case of Embodiment 1. Therefore, a difference (Vstd−Vout) between the reference voltage Vstd for each of the radiation units 210A to 210D and the detection voltage Vout is changed according to a distortion of the tire 300, the difference being outputted from the arithmetic section 250B, so that a distortion of the tire 300 can be detected by a difference (Vstd−Vout).

Moreover, it is needless to say that these embodiments are applicable to sensors for a traction controller or a device which performs active control on a suspension, a stabilizer in the suspension, and so on.

Additionally, the configurations of the embodiments may be combined or some of the constituent elements may be replaced in the tire distortion detector.

In these embodiments, a distortion of the tire is mainly detected by a change in the intensity of an electromagnetic wave radiated from the sensor unit 100. It is apparent from these embodiments that a distortion of the tire may be detected by a change in the phase or frequency of an electromagnetic wave.

In these embodiments, the first and second frequencies are both set at 2.45 GHz but are not particularly limited. As described above, a frequency of 1 GHz or higher can considerably reduce the influence of the reflection and interruption of an electromagnetic wave due to a metal in the tire, and thus a distortion of the tire can be detected with high accuracy. The first and second frequencies may be different from each other. It is preferable to properly set the first and second frequencies in designing. Further, it is needless to say that the first and second frequencies may be properly set according to the shape and size of the conductor pattern 140a, which is changed in shape according to a distortion of the tire to change the resonance frequency of a radiated electromagnetic wave.

Moreover, the conductor pattern 140a is a rectangular wave in these embodiments. The conductor pattern 140a is changed in shape according to a distortion of the tire to change the resonance frequency of a radiated electromagnetic wave. A person skilled in the art would sufficiently understand from the contents of these embodiments that the shape of the conductor pattern 140a is not particularly limited.

Further, it is needless to say that the same effect can be obtained also by embedding the sensor units 100 in the side wall of the tire.

In these embodiments, a distortion is detected in a predetermined order for two or more tires attached to a vehicle. However, when a detection is made in the predetermined order, there is a possibility that a distortion cannot be detected in some regions of the tire due to the number of revolutions of the tire. In order to avoid such a problem, a distortion of the tire may be detected at random.

In these embodiments, the conductor pattern 140a is used as an antenna for radiating an electromagnetic wave in the sensor unit 100. It is needless to say that the same effect can be achieved by providing another antenna for radiating an electromagnetic wave or using the antenna 110 for radiation and reception, and using the conductor pattern 140a as an inductor for determining the resonance frequency of the oscillator circuit 131.

INDUSTRIAL APPLICABILITY

As described above, according to the present invention, a workload for manufacturing a tire can be reduced as compared with the conventional art, applicability is widened to a control system such as a stability control system, a deterioration and a damage in a sensor unit can be reduced that are caused by heat generated on the tire during the running of a vehicle, and a distortion of the tire can be detected with high accuracy.

The invention claimed is:

1. A tire distortion detecting method using a plurality of sensor units which are embedded in a tire at predetermined intervals in a circumferential direction of the tire and each have a conductor pattern changed in shape according to a distortion of the tire, and a monitoring device having a radiation unit provided in a tire house of a vehicle,
   characterized in that an electromagnetic wave of a first frequency is radiated from the radiation unit to the sensor unit,
   the sensor unit having received the electromagnetic wave of the first frequency converts energy of the electromagnetic wave of the first frequency into electric energy and uses the electric energy to drive electromagnetic wave radiating means,
   according to a distortion of the conductor pattern, the electromagnetic wave radiating means changes a resonance frequency in a frequency band having a predetermined width including a second frequency, which serves as a fundamental frequency, and the electromagnetic wave radiating means radiates the electromagnetic wave, and
   the monitoring device receives the electromagnetic wave having been radiated from the electromagnetic wave radiating means of the sensor unit, detects at least one of an intensity, phase, and frequency of the received electromagnetic wave, and detects a distortion of the tire by comparing the detection result and a detection result stored when no distortion occurs on the tire.

2. The tire distortion detecting method according to claim 1, characterized in that the radiation unit radiates an electromagnetic wave to the one or more sensor units of the tire within a predetermined distance from a position where the radiation unit is attached.

3. The tire distortion detecting method according to claim 2, characterized in that an electromagnetic wave is radiated in a time sharing manner from the radiation units disposed on two or more different positions of the tire house.

4. The tire distortion detecting method according to claim 1, characterized in that the first frequency and the second frequency are set at a frequency of 1 GHz or higher.

5. The tire distortion detecting method according to claim 1, characterized in that the sensor unit transmits identification information specific to the sensor unit by using the electromagnetic wave, and
   the monitoring device identifies the sensor unit based on the identification information received from the sensor unit.

6. A tire distortion detector for detecting a distortion of a tire during running of a vehicle,
   characterized in that the detector is constituted of a plurality of sensor units embedded in the tire at predetermined intervals in a circumferential direction of the tire, and a monitoring device including a radiation unit provided in a tire house of the vehicle,
   the sensor unit comprises:
   a conductor pattern of a predetermined shape on a surface of a sheet which is flexible and electrically insulative with a predetermined area,
   means for receiving an electromagnetic wave of a first frequency from the radiation unit and converting high frequency energy of the electromagnetic wave into electric energy, and
   means which is operated by the electric energy, is connected to the conductor pattern, changes a resonance frequency, according to a distortion of the conductor pattern, in a frequency band having a predetermined width including a second frequency serving as a fundamental frequency, and radiates an electromagnetic wave, and
   the monitoring device comprises:
   means for radiating the electromagnetic wave of the first frequency from the radiation unit to the sensor unit,
   means for receiving an electromagnetic wave radiated from the sensor unit,
   means for detecting at least one of an intensity, phase, and frequency of the received electromagnetic wave,
   means for storing a detection result obtained when no distortion occurs on the tire, and
   means for detecting a distortion of the tire by comparing the detection result and the detection result obtained when no distortion occurs on the tire.

7. The tire distortion detector according to claim 6, characterized in that at least a part of the conductor pattern is shaped like a rectangular wave.

8. The tire distortion detector according to claim 6, characterized in that the first frequency and the second frequency are set at a frequency of 1 GHz or higher.

9. The tire distortion detector according to claim 6, characterized in that the first frequency and the second frequency are set at the same frequency, and
   the monitoring device comprises means for alternately repeats radiation of an electromagnetic wave of the first frequency and reception of an electromagnetic wave radiated from the sensor unit.

10. The tire distortion detector according to claim 6, characterized in that the monitoring device comprises a plurality of radiation units provided on two or more different position of the tire house and means for radiating an electromagnetic wave in a time sharing manner from each of the radiation units, and
    each of the radiation units radiates an electromagnetic wave to the one or more sensor units of the tire within a predetermined distance from a position where the radiation unit is attached.

11. The tire distortion detector according to claim 6, characterized in that the sensor unit has means for switching use of the conductor pattern serving as an antenna between reception of an electromagnetic wave of the first frequency and radiation of an electromagnetic wave of the second frequency.

12. The tire distortion detector according to claim 6, characterized in that the sensor unit comprises:
means for storing identification information specific to the sensor unit, and
means for transmitting the stored identification information by using an electromagnetic wave, and
the monitoring device comprises:
means for receiving the identification information transmitted from the sensor unit, and
means for identifying the sensor unit based on the received identification information.

13. A sensor unit for a tire distortion detector comprising a plurality of sensor units embedded in the tire at predetermined intervals in a circumferential direction of a tire and a monitoring device having a radiation unit provided in a tire house of a vehicle,
characterized in that the sensor unit comprises:
a conductor pattern of a predetermined shape on a surface of a sheet which is flexible, and electrically insulative with a predetermined area,
means for receiving an electromagnetic wave of a first frequency from the radiation unit and converting high frequency energy of the electromagnetic wave into electric energy, and
means which is operated by the electric energy, is connected to the conductor pattern, changes a resonance frequency, according to a distortion of the conductor pattern, in a frequency band having a predetermined width including a second frequency serving as a fundamental frequency, and radiates an electromagnetic wave.

14. The sensor unit according to claim 13, characterized in that at least a part of the conductor pattern is shaped like a rectangular wave.

15. The sensor unit according to claim 13, characterized in that the first frequency is set at a frequency of 1 GHz or higher.

16. The sensor unit according to claim 13, characterized by further comprising means for switching use of the conductor pattern serving as an antenna between reception of an electromagnetic wave of the first frequency and radiation of an electromagnetic wave of the second frequency.

17. The sensor unit according to claim 13, characterized by further comprising means for storing identification information specific to the sensor unit, and
means for transmitting the stored identification information by using the electromagnetic wave.

18. A tire, characterized by comprising a plurality of sensor units embedded in the tire at predetermined intervals in a circumferential direction of the tire,
the sensor unit comprising:
a conductor pattern of a predetermined shape on a surface of a sheet which is flexible and electrically insulative with a predetermined area,
means for receiving an electromagnetic wave of a first frequency from the radiation unit and converting high frequency energy of the electromagnetic wave into electric energy, and
means which is operated by the electric energy, is connected to the conductor pattern, changes a resonance frequency, according to a distortion of the conductor pattern, in a frequency band having a predetermined width including a second frequency serving as a fundamental frequency, and radiates an electromagnetic wave.

19. The tire according to claim 18, characterized in that at least a part of the conductor pattern is shaped like a rectangular wave.

20. The tire according to claim 18, characterized in that the first frequency is set at a frequency of 1 GHz or higher.

21. The tire according to claim 18, characterized in that the plurality of sensor units are disposed in the same layer of the tire.

22. The tire according to claim 18, characterized in that at least the four or more sensor units are embedded at regular intervals.

* * * * *